(12) United States Patent
Arbabian et al.

(10) Patent No.: US 11,995,766 B2
(45) Date of Patent: May 28, 2024

(54) CENTRALIZED TRACKING SYSTEM WITH DISTRIBUTED FIXED SENSORS

(71) Applicant: Plato Systems, Inc., San Carlos, CA (US)

(72) Inventors: Mohammad Amin Arbabian, San Francisco, CA (US); Kiarash Amiri, San Francisco, CA (US); Aria Pezeshk, Washington, DC (US); Mashhour Solh, San Jose, CA (US); Brian Martin Sandler, San Carlos, CA (US)

(73) Assignee: Plato Systems, Inc., San Carlos, CA (US)

( * ) Notice: Subject to any disclaimer, the term of this patent is extended or adjusted under 35 U.S.C. 154(b) by 32 days.

(21) Appl. No.: 17/511,447

(22) Filed: Oct. 26, 2021

(65) Prior Publication Data
US 2022/0130109 A1   Apr. 28, 2022

Related U.S. Application Data

(60) Provisional application No. 63/198,533, filed on Oct. 26, 2020.

(51) Int. Cl.
*G06T 17/05* (2011.01)
*G06F 18/25* (2023.01)
(Continued)

(52) U.S. Cl.
CPC .............. *G06T 17/05* (2013.01); *G06F 18/25* (2023.01); *G06F 18/256* (2023.01); *G06V 10/80* (2022.01);
(Continued)

(58) Field of Classification Search
CPC ..... G06T 17/05; G06T 2200/24; G06F 18/25; G06F 18/256; G06V 10/80; G06V 20/52; G06V 10/811; G08B 23/00
(Continued)

(56) References Cited

U.S. PATENT DOCUMENTS 7,450,735 B1 * 11/2008 Shah ..................... G06T 7/292
348/169
7,460,951 B2   12/2008 Altan et al.
(Continued)

FOREIGN PATENT DOCUMENTS

CN         111554088        8/2020
JP         2023547884       11/2023
(Continued)

OTHER PUBLICATIONS

"International Application Serial No. PCT US2021 056706, International Search Report dated Jan. 28, 2022", 2 pgs.
(Continued)

*Primary Examiner* — Kathleen Y Dulaney
(74) *Attorney, Agent, or Firm* — Schwegman Lundberg & Woessner, P.A.

(57) ABSTRACT

A sensor system comprising multiple sensor units non-collocated at a site; processing circuitry operatively coupled to memory is configured to perform operations comprising: producing sensor unit tracks, each sensor unit track comprising one or more object attributes including relative object location attributes and non-location attributes; for each sensor unit track, translating the one or more relative object location attributes of the sensor unit track, to one or more universal object location attributes; fusing sets of sensor unit tracks, based at least in part upon corresponding object attributes of the sets of sensor unit tracks, to produce unified site tracks that include the corresponding object attributes; and saving the unified site tracks in a non-transitory storage device.

20 Claims, 14 Drawing Sheets

(51) Int. Cl.
  *G06V 10/80* (2022.01)
  *G06V 20/52* (2022.01)
  *G08B 23/00* (2006.01)

(52) U.S. Cl.
  CPC .............. *G06V 20/52* (2022.01); *G08B 23/00* (2013.01); *G06T 2200/24* (2013.01)

(58) Field of Classification Search
  USPC .......................... 382/312, 103; 348/156, 169
  See application file for complete search history.

(56) References Cited

U.S. PATENT DOCUMENTS

| | | | |
|---|---|---|---|
| 7,825,849 | B2 | 11/2010 | Tsuchida et al. |
| 9,472,097 | B2 * | 10/2016 | Stelzig ................. G08G 1/0133 |
| 10,346,994 | B2 * | 7/2019 | Smith ..................... G06T 7/521 |
| 10,466,361 | B2 * | 11/2019 | Lee ........................ G01S 5/0263 |
| 10,565,468 | B2 * | 2/2020 | Schiffmann ........... G01S 13/867 |
| 10,671,846 | B1 * | 6/2020 | Kamarshi ................. G06T 7/73 |
| 10,983,208 | B2 | 4/2021 | Novoselsky et al. |
| 10,989,791 | B2 | 4/2021 | Tuxen et al. |
| 2002/0049530 | A1 | 4/2002 | Poropat |
| 2006/0028552 | A1 * | 2/2006 | Aggarwal ........ G08B 13/19673 348/169 |
| 2006/0279630 | A1 * | 12/2006 | Aggarwal ........ G08B 13/19645 348/42 |
| 2012/0033083 | A1 * | 2/2012 | Horbinger .............. H04N 7/181 382/103 |
| 2014/0347475 | A1 * | 11/2014 | Divakaran ............. G06V 20/52 348/135 |
| 2016/0092739 | A1 * | 3/2016 | Oami ..................... G06V 20/52 348/159 |
| 2017/0206436 | A1 * | 7/2017 | Schiffmann ........... G01S 13/867 |
| 2017/0336504 | A1 * | 11/2017 | Kai ......................... G01S 13/58 |
| 2019/0132709 | A1 * | 5/2019 | Graefe ..................... G08G 1/04 |
| 2019/0204433 | A1 | 7/2019 | Bui et al. |
| 2019/0294889 | A1 * | 9/2019 | Sriram .............. G06F 18/24143 |
| 2019/0332901 | A1 | 10/2019 | Doumbouya et al. |
| 2019/0333233 | A1 * | 10/2019 | Hu .......................... G01S 13/04 |
| 2020/0234452 | A1 * | 7/2020 | Iino ........................ G08B 25/00 |

FOREIGN PATENT DOCUMENTS

| | | |
|---|---|---|
| WO | 2005120070 | 12/2005 |
| WO | 2020006531 | 1/2020 |
| WO | 2020134512 | 7/2020 |
| WO | 2020214272 | 10/2020 |
| WO | 2021057612 | 4/2021 |
| WO | WO-2022093860 A1 | 5/2022 |

OTHER PUBLICATIONS

"International Application Serial No. PCT US2021 056706, Written Opinion dated Jan. 28, 2022", 15 pgs.

"International Application Serial No. PCT/US2021/056706, International Preliminary Report on Patentability dated May 11, 2023", 17 pgs.

Aeberhard, Michael, "Track-to-Track Fusion With Asynchronous Sensors Using Information Matrix Fusion for Surround Environment Perception", IEEE Transactions on Intelligent Transportation Systems, vol. 13, No. 4, Dec. 2012, (Dec. 2012), 10 pgs.

Favalli, L., "Multi-radar data fusion for object tracking and shape estimation", Signal Processing 48 ( 1996), (1996), 5 pgs.

Jouny, I., "Target Identification Using Multi-radar Fusion", Downloaded From: https: www.spiedigitallibrary.org conference-proceedings-of-spie on Oct. 20, 2021, (May 7, 2007), 7 pgs.

Li, Wangyang, "A Survey on Multisensor Fusion and Consensus Filtering for Sensor Networks", Hindawi Publishing CorporationDiscrete Dynamics in Nature and SocietyVolume 2015, Article ID 663701http: dx.doi.org 10.1155 2015 683701, (Sep. 29, 2015), 13 pgs.

Muresan, Mircea Paul, "Stabilization and Validation of 3D Object Position Using Multimodal Sensor Fusion and Semantic Segmentation", Sensors 2020, 20, 1110; doi:10.3390 s20041110, (Feb. 18, 2020), 33 pgs.

Natour, Ghina El, "Toward 3D Reconstruction of Outdoor Scenes Using an MMW Radar and a Monocular Vision Sensor", Sensors 2015, 15, 25937-25967; dol: 10.3390 s151025937, (Oct. 14, 2015), 32 pgs.

Rutten, M. G., "Track Fusion in Over-the-horizon Radar Networks", ISIF, Commonwealth of Australia, (2003), 8 pgs.

"European Application Serial No. 21887370.1, Extended European Search Report mailed Mar. 19, 2024", 14 pgs.

* cited by examiner

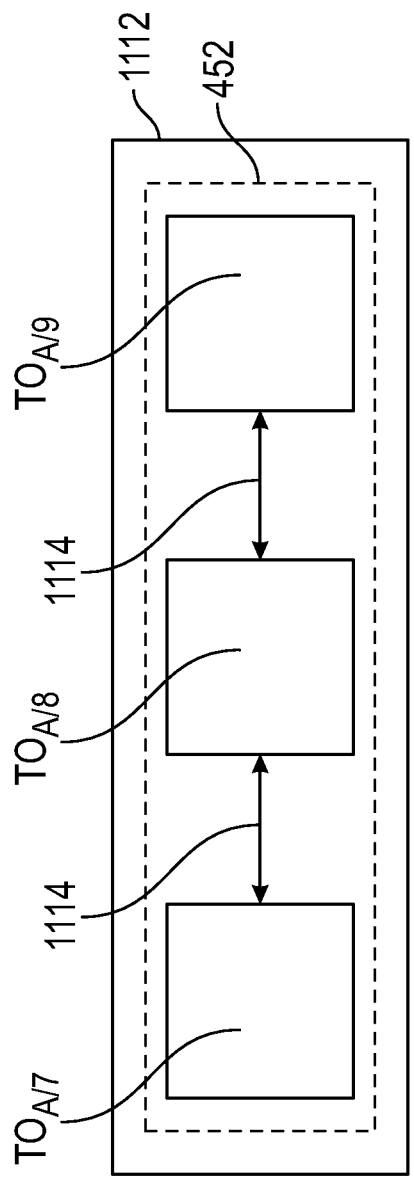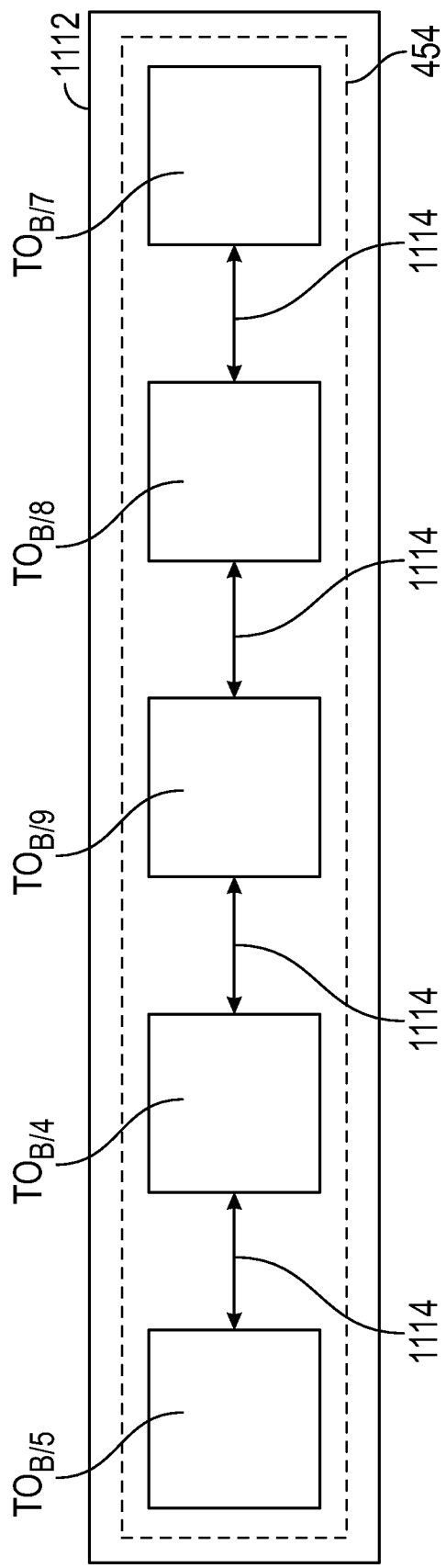

CENTRALIZED TRACKING SYSTEM WITH DISTRIBUTED FIXED SENSORS

CROSS REFERENCE TO RELATED APPLICATION

This application claims priority to U.S. provisional application Ser. No. 63/198,533, filed Oct. 26, 2020, entitled, OBJECT LOCATION COORDINATION IN RADAR AND CAMERA USER INTERFACE TO VISUALIZE THE TRACK AND LOCATION, which is incorporated herein in its entirety by this reference.

BACKGROUND

Sensor units can be equipped with any of a variety of sensors including radar, image sensors and Lidar, to name a few. Individual sensors typically have limited fields of view. Accordingly, multiple sensors are often deployed to surveil and monitor large or complex sites. However, the information collected by these multiple sensors can present a fragmented view of a site. There is a need for a sensor system that provides a unified and comprehensive view of a site monitored using multiple sensors.

SUMMARY

The present disclosure generally relates to machines configured to process radar data and image data, including computerized variants of such special-purpose machines and improvements to such variants, and to the technologies by which such special-purpose machines become improved compared to other special-purpose machines that provide technology for processing radar data and image data. In particular, the present disclosure addresses systems and methods for tracking data across fields of view of non-collocated radar and imaging units.

According to some aspects of the technology described herein, a system includes processing circuitry, memory, and multiple non-collocated sensor units at a site. The processing circuitry produces one or more sensor tracks at each of the multiple sensor units at each of the multiple sensor units. Each sensor unit track comprises one or more object attributes including one or more relative object location attributes and one or more non-location attributes. For each sensor unit track, the processor circuitry translates the one or more relative object location attributes of the sensor unit track, to one or more universal object location attributes. The processor circuitry fuses one or more sets of sensor unit tracks based upon corresponding object attributes of the sets of sensor unit tracks, to produce one or more unified site tracks that include one or more of the corresponding object attributes. The processing circuitry saves the one or more unified site tracks in a non-transitory storage device.

BRIEF DESCRIPTION OF THE DRAWINGS

FIG. 5 is an illustrative drawing representing a first unified site track stored in a storage memory at the cross-unit tracker.

FIG. 6 is an illustrative drawing representing a second unified site track stored in the storage memory at the cross-unit tracker.

DETAILED DESCRIPTION

The present disclosure generally relates to special-purpose computing machines configured to use multiple sensors located at a site and having individual sensor fields of view, to create individual sensor unit tracks that each separately identifies and tracks an object, which can include people, vehicles or other entities, and to use the separate object sensor unit tracks to identify and track the object across the site. The present disclosure also relates to the technologies by which such special-purpose machines become improved compared to other special-purpose machines that provide technology to identify and track objects. The present disclosure also relates to deploying multiple non-collocated sensor units, having different fields of view and different local sensor coordinate systems to track objects across their different fields of view by translating location information in sensor unit tracks to track from local coordinate systems to a universal coordinate system. Moreover, the present disclosure addresses systems and methods for producing a unified visual display of an object's locations at a site based upon fusion of sensor unit tracks corresponding to the object, produced by different sensor units at the site, the sensor tracks indicating different locations of the object while at the site. Collectively, the fused sensor unit tracks contain location information that provides a mapping of a sequence of locations traversed by the object at the site.

Overall Sensor System Architecture

Figure 1:
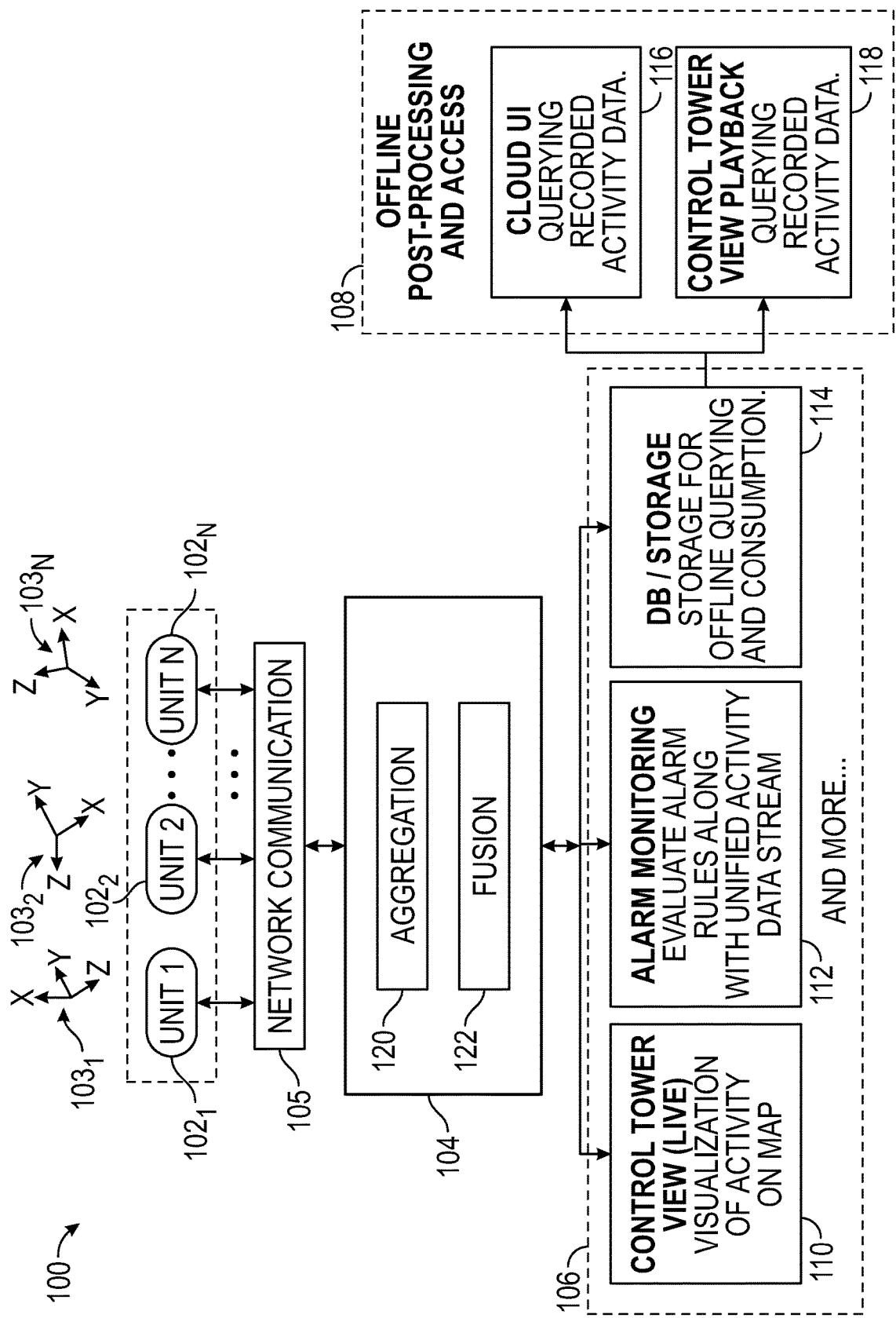
FIG. 1 is an illustrative block diagram of an example sensor system in accordance with some embodiments.

FIG. 1 is an illustrative block diagram of an example sensor system 100 in accordance with some embodiments. The sensor system 100 includes multiple sensor units $102_1$-

$102_n$, a network module 105, (which can include a physical connection that may be wired (e.g., CAT7 Ethernet) or wireless (e.g., WiFi)), a cross-unit tracker 104, an output processing system 106, and an activity data access system 108.

Example sensor units $102_1$-$102_n$ are each equipped with one or more sensors including a depth sensor. In an example system 100, at least two of the sensor units have partially overlapping fields of view. Each sensor unit includes a computing machine configured using instructions stored in a non-transitory memory device, to control tracking of objects sensed using the one or more sensors of the sensor unit. More particularly, each sensor unit's computing machine is configured to detect and track an object within the sensor unit's FOV. As used herein, the act of "tracking" an object refers to analyzing sensor data captured from objects in a site, e.g. data from sensed electromagnetic energy, light, thermal energy, reflected radar signals, reflected sonar signals, or ultrasound signals, used to determine attributes of the object, such as location, velocity, acceleration, heading, and object identity. Moreover, each sensor unit's computing machine is configured to create and store in one or more memory devices, a sensor unit track for each object detected using the sensor unit's one or more sensors. As used herein a "sensor unit track" refers to information stored in memory that is determined based upon the tracking of an object by a sensor unit, indicating attributes determined for the detected object. Example attributes stored in object tracks include object location relative to sensor unit tracking the object over the course of a time interval (referred to herein as "relative object location"), object velocity, object acceleration, object heading, object classification, and track identifier (referred to as "object ID").

Each individual sensor unit $102_1$-$102_n$ determines one or more object attributes based at least in part upon an object's position relative to the position of said sensor unit. Each sensor unit $102_1$-$102_n$ has a corresponding local sensor unit coordinate system $103_1$-$103_n$. Each individual sensor unit determines object location and object motion relative to the individual sensor unit's coordinate system. Object attributes determined by individual sensor units are referred to herein as "relative object attributes". More particularly, each individual sensor unit determines one or more relative object attributes by capturing and analyzing data indicative of one or more of the object's location, velocity, acceleration, and heading relative to the sensor unit's coordinate system, independent of a separate, universal coordinate system (e.g., example universal coordinate system 303 shown in FIG. 3) representing physical locations at a site where the sensor unit is located. As used herein, the term "universal coordinate system" refers to a coordinate system specified relative to a physical site where the sensor units $102_1$-$102_n$ are located.

As used herein, the term "site" refers to a physical area where the sensor units $102_1$-$102_n$ are located. A site can be indoors, outdoors, or partially indoors and partially outdoors. An example site can consist entirely of the interior of a structure such as a building. Alternatively, an example site can encompass an indoor/outdoor campus that includes both interiors and exteriors of building structures and includes outdoor spaces.

Individual sensor units $102_1$-$102_n$ have known predetermined physical locations and known physical FOVs at a site where the sensor units $102_1$-$102_n$ are collectively located. Thus, each sensor unit has a known location relative to a universal coordinate system and has a known FOV relative to the universal coordinate system.

The example sensor system 100 uses a "global" universal coordinate system specified relative to geographic locations in the real world. A "global universal coordinate system" references sensor unit physical locations and sensor unit FOVs relative to locations and orientations in the real world. As used herein, "geolocation" refers to a geographic location in the real world. Two-dimensional (2D) geolocation typically is specified in terms of global coordinates such as latitude and longitude ("lat/lon") relative to a real-world map specified using the World Geodetic System (WGS84), which describe the physical location of an entity in the world. Three-dimensional (3D) geolocation typically is specified in terms of global coordinates: latitude, longitude, and height (sometimes referred to as altitude). Example sensor units are equipped with Global Navigation Satellite system (GNSS) units or other geolocation devices to determine their respective exact geolocations. Alternatively, the geolocations of the sensor units can be determined by a surveyor at time of installation, or approximately determined at the time of installation and then further refined based on the sensor measurements, for example in determining the location of the sensor unit relative to known landmarks in the sensor FOV (that have a known geolocation), or relative to other sensor units with known geolocations.

An alternative example sensor system (not shown) uses a "site map" universal coordinate system specified relative to a local site map, independent of a world view. As used herein a "site map" refers to a map representing the physical locations and orientations of sensor units relative to one another at a site. A "site-specific universal coordinate system" references sensor unit physical locations and sensor unit FOVs relative to a site map. It is contemplated that a local site map coordinate system can be used for indoor sites where sensor units do not have ready access to GNSS communications.

In an example sensor system 100, the example sensor units $102_1$-$102_n$ are each configured to translate one or more relative object attributes within a sensor unit track to corresponding universal object attributes. As used herein, "universal object attributes" refer to one or more object attributes that are based upon an object's universal location, determined relative to a universal coordinate system. Relative object attributes corresponding to an individual sensor unit are translated to universal object attributes, based upon the sensor unit's predetermined universal location and universal FOV. In the example sensor system 100, the individual sensor units themselves perform translations of relative object attribute information to universal object attribute information (e.g., translate a relative location to a universal location). In an alternative example sensor system (not shown), the cross-unit tracker 104 is configured to translate relative object attribute information to universal object attribute information. In the example sensor system 100, a projection method, which is described more fully below, is used to translate relative object locations to universal object locations.

Each of the sensor units $102_1$-$102_n$ provides a stream of sensor unit tracks over the network 103 to the cross-tracker unit 104. Each sensor unit can simultaneously track multiple objects within its field of view. Moreover, each sensor unit continuously refreshes information within a sensor unit track as a corresponding object moves within the sensor unit's FOV. Each sensor unit produces an information stream that includes multiple sensor unit object tracks. Each sensor unit object track includes corresponding object attributes and corresponding metadata. In an example sensor system 100, the metadata includes object class, velocity, acceleration, track identifier, classification, heading and bounding box.

The cross-unit tracker 104 includes a computing machine configured using instructions stored in one or more non-transitory memory devices to create a unified universal representation (i.e. referenced to the universal coordinate system) of object activity across the FOVs of the multiple sensor units of the sensor system 100. The cross-unit tracker 104 includes an aggregation module 120 and a fusion module 122. The fusion module 122 is configured to fuse sensor unit tracks corresponding to a common object (i.e., to the same object) tracked by different sensor units. The cross-unit tracker 104 can include a server computer system that can optionally be located on a separate premise than the sensor units, for example in a facility owned by a commercial cloud computing provider, such as Amazon Web Services, for example.

An example output processing system 106 includes multiple output subsystems each performing one or more different output operations based upon the fused sensor unit tracks. Example output subsystems include an activity visualization subsystem 110, an alarm monitoring subsystem 112 and a query database subsystem 114. An example activity data access system 108 includes a cloud-hosted web application user interface 116 for use in querying activity data stored in the query database subsystem 114 and includes a control tower view playback system 118 for use in querying recorded activity.

Overall Sensor System Operation

Figure 2:
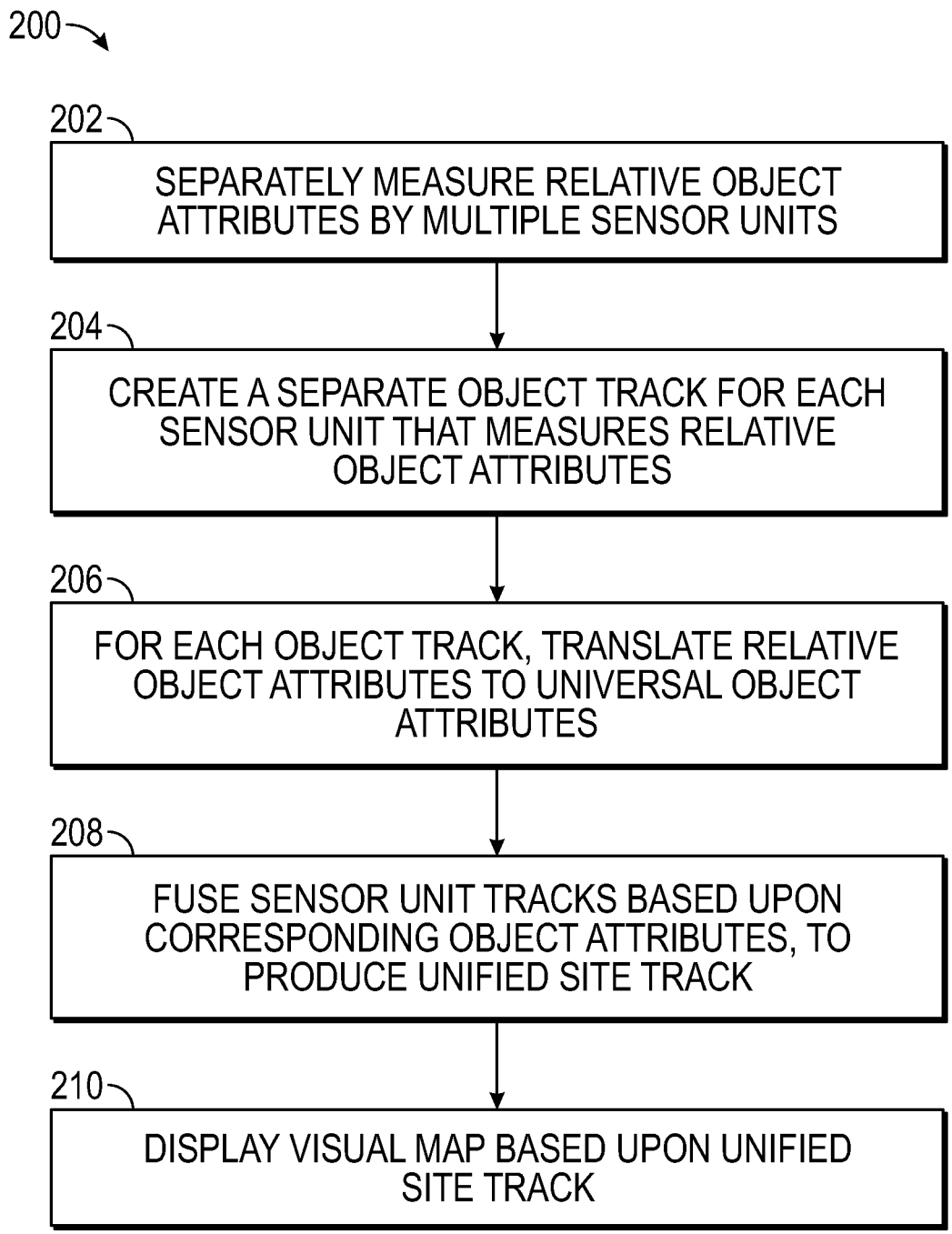
FIG. 2 is an illustrative flow diagram representing an example method performed using the system of FIG. 1 in accordance with some embodiments.

FIG. 2 is an illustrative flow diagram representing an example method performed using the sensor system 100 of FIG. 1. One or more computing machines of the sensor units $102_1$-$102_n$, located at a site, and the cross-unit tracker 104 are programmed with instructions stored in a machine-readable memory device to perform the following operations. In operation 202, multiple sensor units at the site separately determine one or more relative object attributes for an object sensed within their respective fields of view. In the example system 100, the multiple sensor units separately determine relative location, relative velocity, relative acceleration, relative heading, and object classification. Moreover, each sensor unit can optionally determine additional metadata related to a tracked object at an instant in time. For example, a sensor unit can export a set of image features as computed by a deep neural network or other computer vision method that embed and summarize certain characteristics of the object in terms of its visual appearance or context in space. These features can be used to reidentify the same object when it is seen by another sensor unit, or for use in queries in a database, or for running other high-level rules or algorithms that contribute to tracking, classification, or recognition of the target. Unlike object location attributes such as velocity, acceleration and location, the example additional metadata do not undergo a transformation to a universal coordinate system.

In operation 204, a separate sensor unit track is created at each sensor unit that measures one or more of the object's relative object attributes. In operation 206, for each sensor unit track, one or more relative object location attributes indicated within the sensor unit track is translated to one or more universal object location attributes. Relative object locations are translated to universal object locations. Relative object velocities are translated to universal object velocities. Relative object accelerations are translated to universal object accelerations. Relative object headings are translated to universal object headings. In operation 208, sensor unit tracks created by different sensor units for a common (i.e., the same) object are fused to produce a unified site track corresponding to the object. In operation 210, a visual map is produced at an electronic display screen, that indicates object locations relative to a universal coordinate system associated with a site map, based upon universal locations indicated within the fused sensor unit tracks. It will be appreciated that in the fusion operation 208, the universal object location information within the sensor unit tracks is used as a basis to fuse sensor unit tracks corresponding to the same object, to create a unified site track corresponding to the object, and that in operation 210, the universal object location information within the sensor unit tracks is used to create a visual map of the object's path within the site.

Example Sensor System Deployment Site Map

Figure 3:
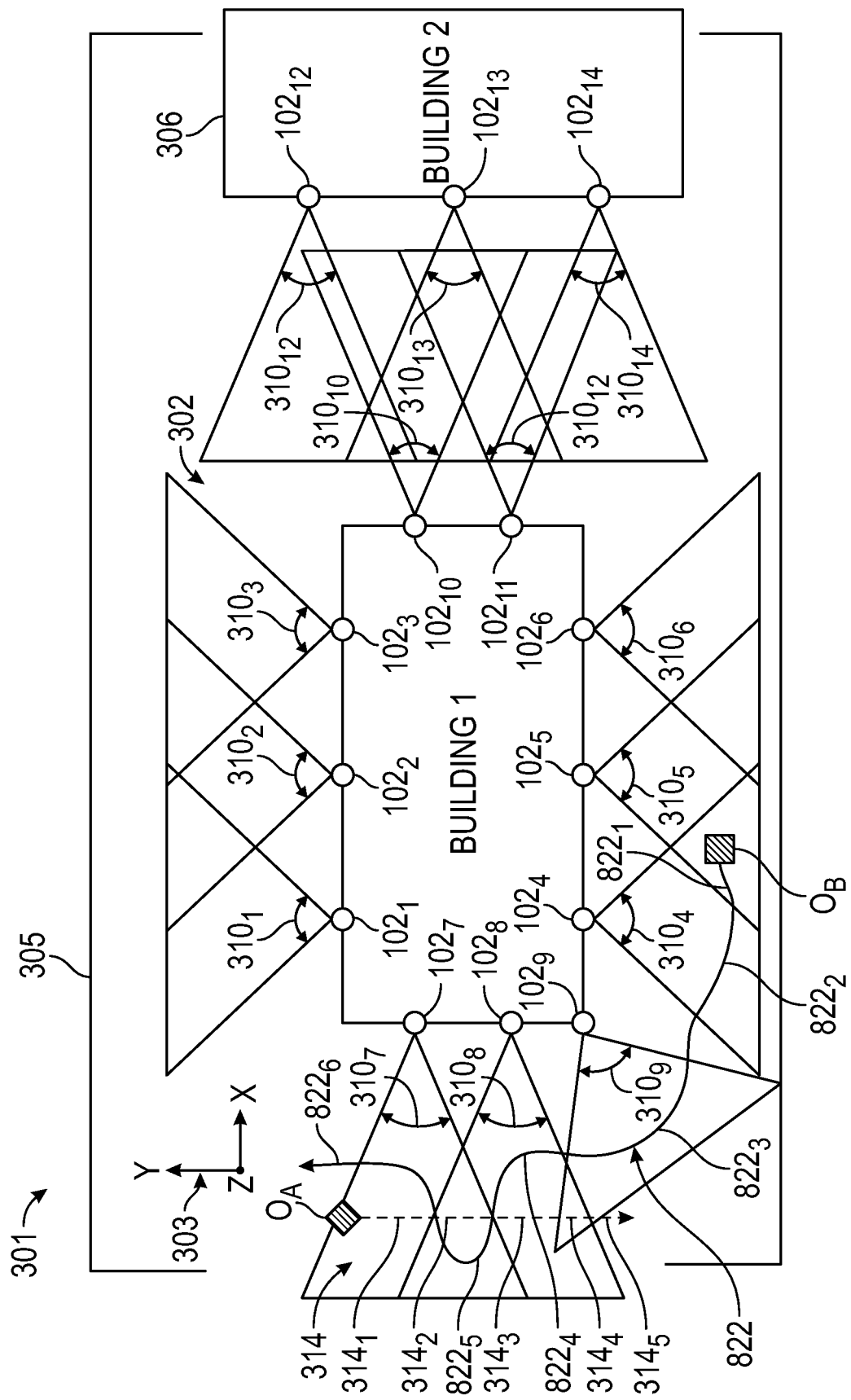
FIG. 3 is an illustrative drawing of an electronic display screen displaying an example site map representing an aerial view of a site having an example arrangement of the sensor units of the sensor system of FIG. 1.

FIG. 3 is an illustrative drawing of an electronic display screen 305 displaying example site map 301 representing an aerial view of a site 302 having an example arrangement of the sensor units $102_1$-$102_{14}$ and corresponding FOVs $310_1$ to $103_{14}$ of the sensor system 100. In the example arrangement of FIG. 3, the number of sensor units is n=14. The sensors are not co-located and have different FOVs, albeit some overlapping, and are associated with different local sensor unit coordinate systems $103_1$-$103_n$ used to determine object location relative to sensor unit location. The site 303 is associated with a universal coordinate system 303 used to identify locations at the site.

The example site 302 includes first and second buildings 304, 306. The example site 302 includes multiple sensor units $102_1$-$102_{11}$ located at the first building 304 and includes multiple sensor units $102_{12}$-$102_{14}$ located at the second building 306. Each sensor has a known universal location, as explained above. Each individual sensor unit is positioned to have a corresponding individual field of view (FOV). As shown, for example, sensor unit $102_1$ has a corresponding FOV $310_1$, sensor unit $102_2$ has a corresponding FOV $310_2$, sensor unit $102_3$ has a corresponding FOV $310_3$, sensor unit $102_4$ has a corresponding FOV $310_4$, etc. Individual sensor units, in the example arrangement of the sensor units $102_1$-$102_{14}$, are positioned to have FOVs that partially overlap with FOVs of one or more other sensor units. For example, a second sensor unit $102_2$ is positioned so that its FOV $310_2$ partially overlaps a first FOV $310_1$ corresponding to a first sensor unit $102_2$ and partially overlaps a third FOV $310_3$ corresponding to a third sensor unit $102_3$. However, in an alternative example sensor unit arrangement (not shown), one or more sensor unit FOVs do not overlap with other sensor unit FOVs. As explained more fully below, an object can be tracked across FOVs that do not overlap, based on a condition that the FOVs are spaced close enough together that a predicted location of the object outside a FOV through which the object passed remains accurate for long enough to predict the object's location in an adjacent FOV.

Example Unified Site View

Overlayed on the site map 301 in the electronic display screen 305, is an image representing a first object path 314 within the represented site 302. Also, overlayed on the site map 301 electronic display screen 305, is an image representing a second object path 822 within the represented site 303. The electronically displayed site map 301 together with the overlayed images of first and second object paths 314, 822 provide a unified site view that shows visual representations of the entire first and second paths 314, 822 in the context of a visual representation of the entire site 302.

Example First Object Path

The first object path 314 is assembled based upon universal object attributes of the first object $O_A$ measured within FOVs $310_7$, $310_8$, and $310_9$. An example first object $O_A$ is shown to have traversed, in order, the example seventh, eighth, and ninth FOVs $310_7$, $310_8$, and $310_9$. The first object $O_A$ can be a person or vehicle, for example. The first object $O_A$ followed a physical path 314 that includes a first path segment $314_1$ solely within the seventh FOV $310_7$, a second path segment $314_2$ within overlapping portions of the seventh and eighth FOVs $310_7$-$310_8$, a third path segment $314_3$ solely within the eighth FOV $310_8$, a fourth path segment $314_4$ within overlapping portions of the eighth and ninth FOVs $310_8$-$310_9$, and a fifth $314_5$ path segment solely within the ninth FOV $310_9$. In this example, the seventh sensor unit $102_7$ tracks the first object $O_A$ and determines location of the first object $O_A$ relative to location of the seventh sensor unit $102_7$, as the first object $O_A$ traverses the first and second path segments $314_1$, $314_2$. The eighth sensor unit $102_8$ tracks the first object $O_A$ and determines location of the first object $O_A$ relative to location of the eighth sensor unit $102_8$, as the first object $O_A$ traverses the second, third, and fourth path segments $314_2$, $314_3$, and $314_4$. The ninth sensor unit $102_9$ tracks the first object $O_A$ and determines location of the first object $O_A$ relative to the location of the ninth sensor $310_9$, as the first object $O_A$ traverses fourth and fifth path segments $310_4$, $310_5$.

Example Second Object Path

The second object path 822 is assembled based upon universal object attributes of the second object $O_B$ measured within FOVs $310_5$, $310_4$, $310_9$, $310_8$, and $310_7$. The example second object $O_B$ is shown to have traversed, in order, the example fifth, fourth, ninth, eighth, and seventh FOVs $310_4$, $310_5$, $310_9$, $310_8$, $310_7$. The second object $O_B$ followed the physical path 822 that includes a first path segment $822_1$ within overlapping portions of the fifth FOV $310_5$ and the fourth FOV $310_4$; a second path segment $822_2$ solely within the fourth FOV $310_4$; a third path segment $822_3$ solely within the ninth FOV $310_9$; a fourth path segment $822_4$ solely within the eighth FOV $310_8$; a fifth path segment $822_5$ within overlapping portions of the eighth and seventh FOVs $310_8$, $310_7$; and a sixth path segment $822_6$ solely within the seventh FOV $310_7$. In this example, the fifth sensor unit $102_5$ tracks the second object $O_B$ and determines location of the second object $O_B$ relative to location of the fifth sensor unit $102_5$, as the second object $O_B$ traverses the first path segment $822_1$. The fourth sensor unit $102_4$ tracks the second object $O_B$ and determines location of the second object $O_B$ relative to location of the fourth sensor unit $102_4$, as the second object $O_B$ traverses the first and second path segments $822_1$, $822_2$. The ninth sensor unit $102_9$ tracks the second object $O_B$ and determines location of the second object $O_B$ relative to the location of the ninth sensor $310_9$, as the second object $O_B$ traverses third path segment $822_3$. The eighth sensor unit $102_8$ tracks the second object $O_B$ and determines location of the second object $O_B$ relative to location of the eighth sensor $102_8$, as the second object traverses the fourth and fifth path segments $822_4$, $822_5$. The seventh sensor unit $102_7$ tracks the second object $O_B$ and determines location of the second object $O_B$ relative to location of the seventh sensor $102_7$, as the second object $O_B$ traverses the fifth and sixth path segments $822_5$, $822_6$.

Example Operation of Sensor System at the Example Site

Referring to FIG. 3 and to FIG. 2, the first object path 314 shown in the visual site map 301 represents a unified universal representation of activity of the first object $O_A$ in the form of an example first object path image 314 that extends across representations of the multiple FOVs $310_7$-$310_9$ that can be produced according to the method 200. The example first object path image 314 activity representation for the first object $O_A$ is produced based upon associating different respective location object attributes corresponding to the first object $O_A$ produced based upon sensing of that same respective first object $O_A$ within FOVs of different respective sensor units.

More particularly, during operation 202, the seventh sensor unit $102_7$ determines relative object attributes of the first object $O_A$ along first and second path segments $314_1$, $314_2$, relative to the seventh sensor unit $102_7$. During operation 204, the seventh sensor unit $102_7$ produces a sensor unit track indicating the relative object attributes of the object first object $O_A$ as it traversed along the first and second path segments $314_1$, $314_2$. During operation 206, the sensor system 100 translates the relative object attributes within the sensor unit track produced by the seventh sensor unit $102_7$ to location object attributes corresponding to the first object $O_A$ as tracked by the seventh sensor $102_7$.

Similarly, during operation 202, the eighth sensor unit $102_8$ determines relative object attributes of the first object $O_A$ along the second, third, and fourth path segments $314_2$, $314_3$, and $314_4$, relative to the eighth sensor unit $102_8$. During operation 204, the eighth sensor unit $102_8$ produces a sensor unit track indicating the relative object attributes of the first object $O_A$ as it traversed along the second, third, and fourth path segments $314_2$, $314_3$, and $314_4$. During operation 206, the sensor system 100 translates the relative object attributes within the sensor unit track produced by the eighth sensor unit $102_8$ to universal object attributes corresponding to the first object $O_A$ as tracked by the eighth sensor $102_8$.

Likewise, during operation 202, the ninth sensor unit $102_9$ determines relative object attributes of the first object $O_A$ along fourth and fifth path segments $314_4$, $314_5$, relative to the ninth sensor unit $102_9$. During operation 204, the ninth sensor unit $102_9$ produces a sensor unit track indicating the relative object attributes of the first object $O_A$ as it traversed along the fourth and fifth path segments $314_4$, $314_5$. During operation 206, the sensor system 102 translates the relative object attributes within the sensor unit track produced by the ninth sensor unit $102_9$ to universal object attributes corresponding to the first object $O_A$ as tracked by the ninth sensor $102_9$.

As explained above, the translations of relative object attributes to object universal object attributes are performed at the sensor units $102_7$, $102_8$, and $102_9$ in an example system 100. It is contemplated that the translations are performed at the cross-unit tracker 104 in an alternative example sensor system (not shown).

During operation 208, the cross-unit tracker 104 fuses separate sensor unit object tracks produced by different sensor units based upon universal object attributes associated with the object tracks at operation 206. During operation 210, the activity visualization subsystem 110 produces a representation of the first object path 314 based at least in part upon associating the universal object attributes corresponding to the first object $O_A$ as tracked by the seventh, eighth, and ninth sensors $102_7$, $102_8$, and $102_9$.

Figure 4:
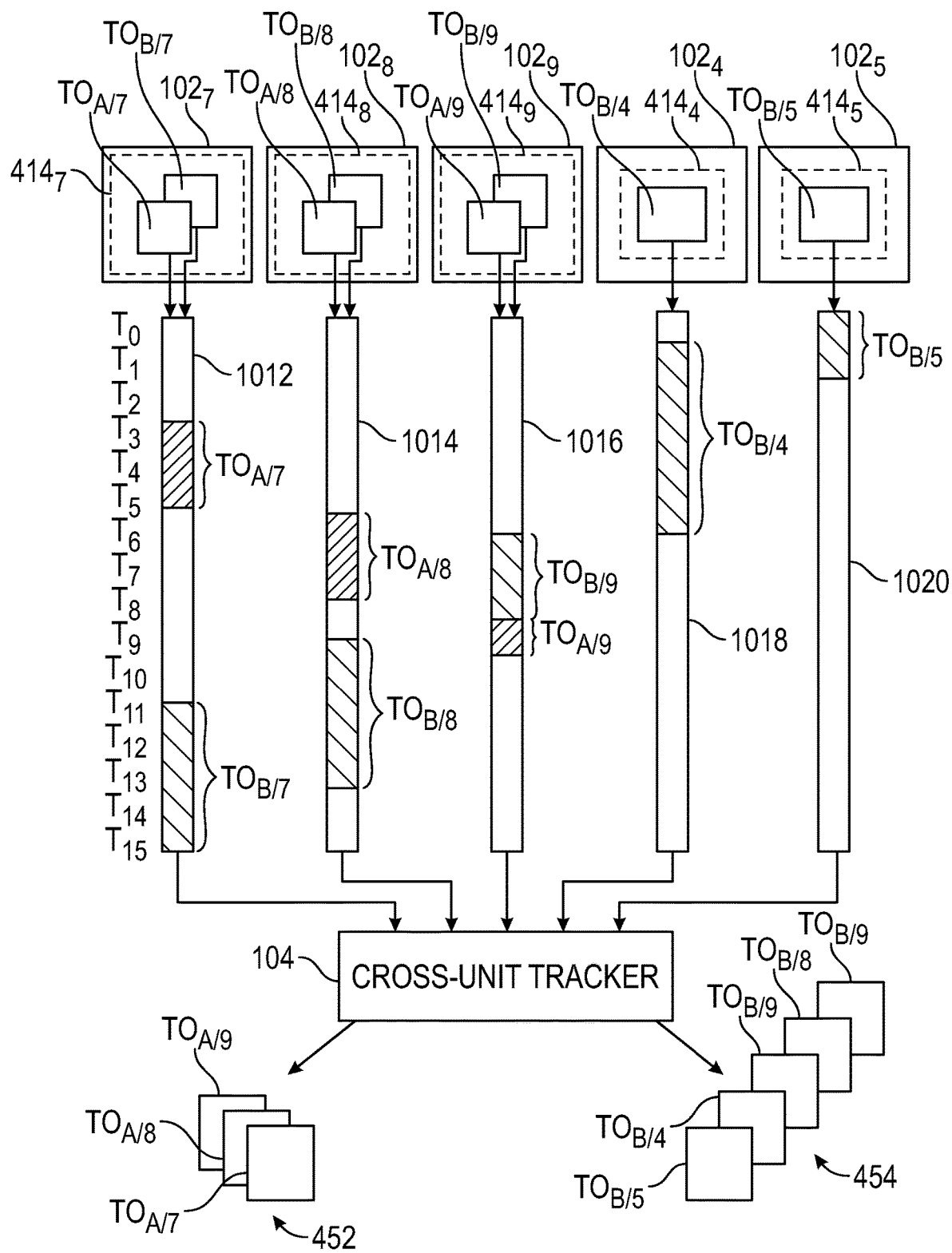
FIG. 4 is an illustrative function flow diagram representing sending of sensor unit tracks over a communication network in individual time-series data streams to the cross-unit tracker of the system of FIG. 1.

Time-Series Data Streams of Sensor Unit Object Tracks Processed at Centralized Cross-Unit Tracker Example FIG. 4 is an illustrative function flow diagram representing sending of sensor unit tracks corresponding to the first and second objects $O_A$, $O_B$ of FIG. 3, over the network 105 in individual time-series data streams to the cross-unit tracker 104. A first sensor unit track $TO_{A/7}$ corresponding to the first object $O_A$, is created and stored in storage memory $414_7$ at the seventh sensor unit $102_7$. The first sensor unit track $TO_{A/7}$ includes attributes of the first object $O_A$ determined based upon tracking of the first object $O_A$ by the seventh sensor unit $102_7$, while the first object crosses the seventh FOV $310_7$. A second sensor unit track $TO_{A/8}$ corresponding to the first object $O_A$, is created and stored in memory $414_4$ at the eighth sensor unit $102_8$. The second sensor unit track $TO_{A/8}$ includes attributes of the first object $O_A$ determined based upon tracking of the first object $O_A$ by the eighth sensor unit $102_8$, while the first object crosses the eighth FOV $310_8$. A third sensor unit track $TO_{A/9}$ corresponding to the first object $O_A$, is created and stored in memory $414_6$ at the ninth sensor unit $102_9$. The third sensor unit track $TO_{A/9}$ includes attributes of the first object $O_A$ determined based upon tracking of the first object $O_A$ by the ninth sensor unit $102_9$, while the first object crosses the ninth FOV $310_9$. A fourth sensor unit track $TO_{B/5}$ corresponding to the second object $O_B$, is created and stored in memory $414_5$ at the fifth sensor unit $102_5$. The fourth sensor unit track $TO_{B/5}$ includes attributes of the second object $O_B$ determined based upon tracking of the second object $O_B$ by the fifth sensor unit $102_5$, while the second object $O_B$ crosses the fifth FOV $310_5$. A fifth sensor unit track $TO_{B/4}$ corresponding to the second object $O_B$ is created and stored in memory $414_4$ at the fourth sensor unit $102_4$. The fifth sensor unit track $TO_{B/4}$ includes attributes of the second object $O_B$ determined based upon tracking of the second object $O_B$ by the fourth sensor unit $102_4$, while the second object $O_B$ crosses the fourth FOV $310_4$. A sixth sensor unit track $TO_{B/9}$ corresponding to the second object $O_B$, is created and stored in the memory $414_9$ at the ninth sensor unit $102_9$. The sixth sensor unit $TO_{B/9}$ includes attributes of the second object $O_B$ determined based upon tracking of the second object $O_B$ by the ninth sensor unit $102_9$, while the second object $O_B$ crosses the ninth FOV $310_9$. A seventh sensor unit track $TO_{B/8}$ corresponding to the second object $O_B$, is created and stored in memory $414_8$ at the eighth sensor unit $102_8$. The seventh sensor unit track $TO_{B/8}$ includes attributes of the second object $O_B$ determined based upon tracking of the second object $O_B$ by the eighth sensor unit $102_8$, while the second object $O_B$ crosses the eighth FOV $310_8$. An eighth sensor unit track $TO_{B/7}$ corresponding to the second object $O_B$, is created and stored in memory $414_7$ at the seventh sensor unit $102_7$. The eighth sensor unit track $TO_{B/7}$ includes attributes of the second object $O_B$ determined based upon tracking of the second object $O_B$ by the seventh sensor unit $102_7$, while the second object $O_B$ crosses the seventh FOV $310_7$.

The seventh sensor unit $102_7$ transmits the first sensor unit track $TO_{A/7}$ and the eighth sensor unit track $TO_{B/7}$ over the network 105 to the cross-unit tracker 104 in a first time-series data stream 1012. The eighth sensor unit $102_8$ transmits the second sensor unit track $TO_{A/8}$ and the seventh sensor unit track $TO_{B/8}$ over the network 105 to the cross-unit tracker 104 in a second time-series data stream 1014. The ninth sensor unit $102_9$ transmits the third sensor unit track $TO_{A/9}$ and the sixth sensor unit track $TO_{B/9}$ over the network 105 to the cross-unit tracker 104 in a third time-series data stream 1016. The fourth sensor unit $102_4$ transmits the fifth sensor unit track $TO_{B/4}$ over the network 105 to the cross-unit tracker 104 in a fourth time-series data stream 1018. The fifth sensor unit $102_5$ transmits the fourth sensor unit track $TO_{B/4}$ over the network 105 to the cross-unit tracker 104 in a fifth time-series data stream 1020.

The cross-unit tracker 104 fuses a first set of sensor unit tracks $TO_{A/7}$, $TO_{A/8}$, and $TO_{A/9}$ corresponding to the first object path 314, into a first unified site track 452. The cross-unit tracker 104 fuses a second set of sensor unit tracks $TO_{B/5}$, $TO_{B/4}$, $TO_{B/9}$, $TO_{B/8}$, and $TO_{B/7}$ corresponding to the second object path 822, into a second unified site track 454. Universal location attribute information in the sensor unit tracks of the first unified site track 452 is used to produce the overlayed image of the first object path 314 in the site map 301. Universal location attribute information in the sensor unit tracks of the second unified site track 454 is used to produce the overlayed image of the second object path 822 in the site map 301. Thus, the sensor system 100 creates a unified site track that contains timestamped universal object location information indicative of an object's location at a site at different times, to track the object across the FOVs of multiple non-collocated sensor units $102_1$-$102_n$ at the site that have different local sensor coordinate systems $103_1$-$103_n$ and that are used to collect the timestamped universal object location information.

FIG. 5 is an illustrative drawing representing a first unified site track data structure 452 saved in a storage memory 1112 at the cross-unit tracker 104. The first unified site track data structure includes the first, second, and third sensor unit tracks $TO_{A/7}$, $TO_{A/8}$, and $TO_{A/9}$, respectively, associated with one another using one or more pointer structures 1114 or other software reference device. The sensor unit tracks in the first unified site track data structure 452 are ordered in time sequence order. FIG. 6 is an illustrative drawing representing a second unified site track data structure 454 saved in the storage memory 1112 at the cross-unit tracker 104. The second unified site track 454 includes the fourth, fifth, sixth, seventh, and eighth sensor unit tracks $TO_{B5}$, $TO_{B4}$, $TO_{B9}$, $TO_{B8}$, and $TO_{B7}$, respectively, associated with one another using one or more pointer structures 1114 or other software reference device. The sensor unit tracks in the second unified site track data structure 454 are ordered in time sequence order. As explained more fully below, the example first and second unified site track data structures 452, 454 may be saved in temporary data buffers for real-time processing or can be saved long-term, in a database storage memory, for example.

Sensor Unit

Figure 7:
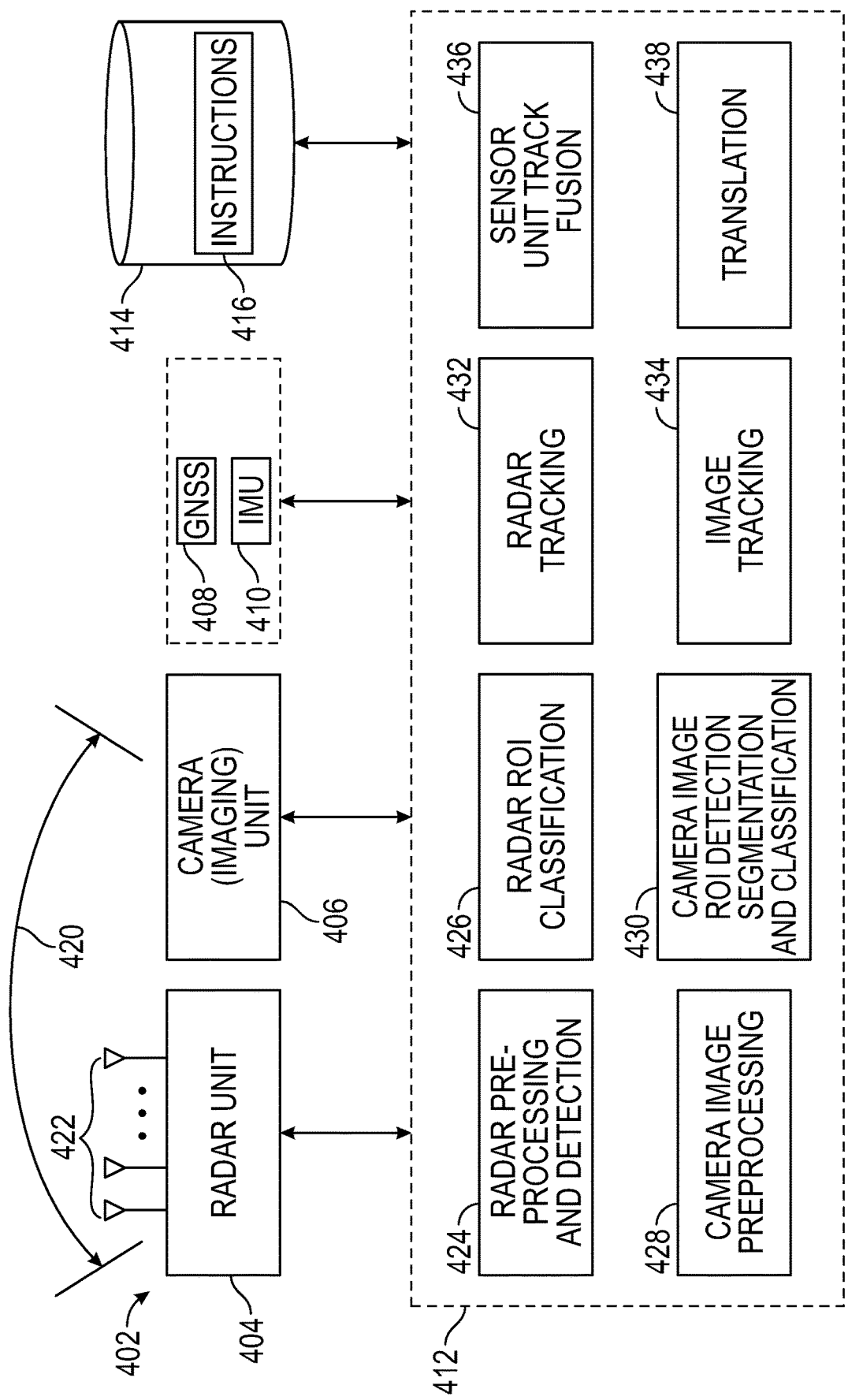
FIG. 7 is an illustrative block diagram showing an example sensor unit.

FIG. 7 is an illustrative block diagram showing an example sensor unit 402 in accordance with some embodiments. The sensor unit 402 includes a radar sensor unit 404, an image sensor unit 406, a GNSS unit 408, an inertial motion unit (IMU) 410 (pose estimation), a computing machine 412 operatively coupled to a non-transitory storage medium 414 storing executable instructions 416, and a network communication unit 418 to send the processed data to the cross-unit tracker 104. The radar sensor unit 404 and the image sensor unit 406 share a sensor unit field of view 420. The radar sensor unit 404 can operate as a depth sensor, through radar range data for example. The image sensor unit 406 also can operate a depth sensor, through stereo imaging, for example. The computing machine 418 includes one or more processor circuits operatively coupled to the storage memory 414. An alternative example sensor unit (not shown) can include an additional or alternative sensor modality, such as Lidar for example.

The IMU 410 estimates static pose and dynamic pose changes. The primary function of the IMU 410 is to estimate static pose of the sensor unit 402, which includes, but is not limited to, direction and compass data (e.g., measuring the gaze point or the center line of the FOV) and sensor orientation (for example pitch and roll of the sensor). Producing dynamic IMU data indicating dynamic changes in pose of the sensor unit 402 is a secondary function of the IMU. The dynamic IMU data is used to correct for platform motion and vibration and the effect these have on the sensor data, essentially cleaning up the sensor output. For example, dynamic IMU data can be used to correct sensor measurements in the event that a pole on which the sensor unit 402 is mounted experiences vibration/shaking due to wind.

An example radar sensor unit 404 operates at a frequency in a range 2 GHz to 100 GHz and preferably between 20 GHz and 80 GHz and includes an antenna array 422 that includes multiple transmit (Tx) and/or receive (Rx) antenna elements and corresponding Tx/Rx channels that operate in MIMO (Multiple Input Multiple Output) mode. An example antenna array 422 includes m-antenna elements in which at least one antenna acts as a transmit antenna and multiple antennas act as receive antennas. In operation, the radar unit 404 uses transmit antenna(s) to transmit radar waveform signals, which may be reflected by objects (not shown) within the sensor unit FOV 420 to the receive antenna(s) of the radar unit 404, which receives the reflected radar data signals and converts them from analog to digital form for processing to infer radar scene information, such as, angle (elevation and azimuth) and Doppler, and range information for objects in the sensor unit FOV 420.

Reflected radar data can be obtained using a variety of transmitted radar waveforms. Radar data include the backscatter data reflected from objects within the sensor unit FOV 420. A common transmit waveform is a sequence of chirps. Another common transmit waveform is a sequence of short pulses. Yet another transmit waveform is direct sequence spread spectrum signaling. The one or more transmit antenna(s) sends a sequence of chirps in a burst, also called a frame. The backscattered radar data is received by the receive antenna(s), down-converted (typically by mixing against the transmitted chirp waveform), frequency-filtered, sampled and converted to digital format using analog-to-digital converters (not shown).

The computing machine 412 is configured according to the computer executable instructions 416 stored in a storage memory 414 to implement a radar pre-processing and detection module 424 that performs operations on received radar data to enable downstream detection, classification, and tracking. An example radar pre-processing and detection module 424 performs a fast Fourier transform (FFT) on the radar data to detect objects within the radar FOV and produces corresponding radar metadata, such as range, doppler, and angle for the radar-detected objects. Heading, ground velocity, and acceleration also can be determined through post processing based upon the radar metadata, e.g., using the tracking module 432.

Figure 8:
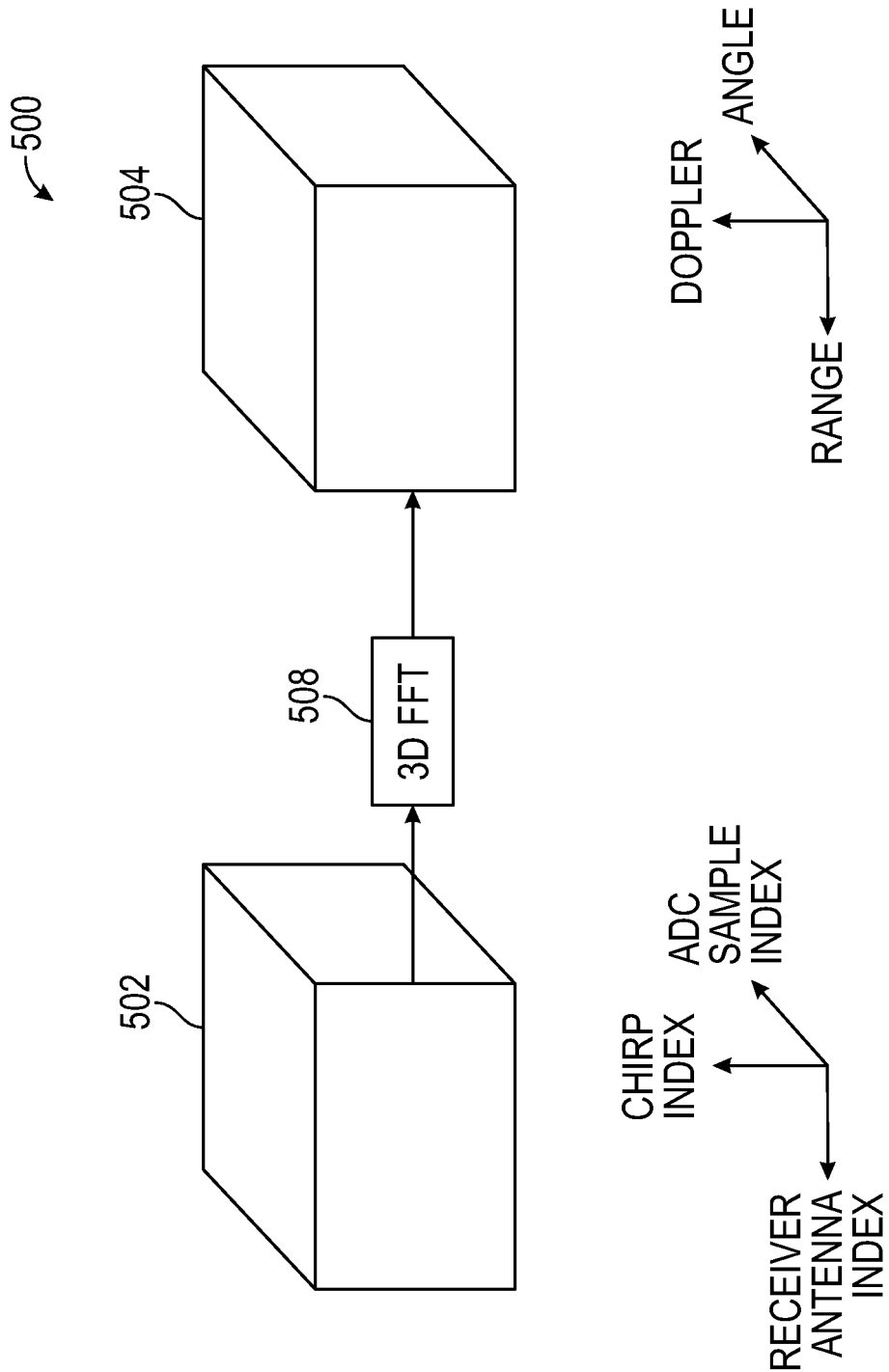
FIG. 8 is an illustrative drawing representing radar pre-processing and target detection.

FIG. 8 illustrates operation of the radar pre-processing and target detection module 424 using an example three-dimensional Fast Fourier Transform (FFT) 500 applied to radar data, to detect targets within the sensor unit FOV 420. As shown, a received radar data module 502 has the axes ADC sample index, chirp index, and receiver antenna index. The target detection processing module 424 applies a 3D FFT to the received radar data module 502 to yield processed radar data module 504. Radar data module 504 has the axes angle, Doppler, and range. As illustrated in FIG. 8, the received radar data module has three dimensions: ADC samples per chirp ("fast time"), chirp index within a frame ("slow time") and receive antenna element. As shown in FIG. 8, this can then be converted to range-Doppler-angle space (processed radar data module 504) by taking a 3D FFT. The FFT in fast time produces range bins, the FFT across slow time produces Doppler bins, and the FFT across receive elements produces angle bins. Some aspects operate in such a transform domain since it provides a geometric interpretation of the collected data. Thus, an example radar pre-processing and target detection module 424 detects and identifies targets in terms of at least range, angle, and Doppler.

It is noted that the processing module 424 uses a 3D FFT to compute azimuth, Doppler, and range. An alternative example processing module (not shown) that computes only range and Doppler uses a 2D FFT. Adding elevation (not shown) requires another FFT across the elevation domain.

Referring again to FIG. 7, a radar ROI classification module 426 classifies moving objects corresponding to detected radar ROIs into one of several category values (e.g., person, animal, vehicle, etc.) and produces corresponding radar classification confidence scores. An example ROI classification module 426 uses Deep learning models based on Recurrent neural networks to classify radar ROIs. Multiple moving objects may be identified and classified based upon radar information captured within the radar FOV.

Still referring to FIG. 7, the image sensor unit 406 captures two-dimensional (2D) image frames from a three-dimensional (3D) world scene within the FOV 420. An example image unit 406 can include a CCD camera or can include a CMOS camera. Computing machine 412 is configured with the executable instructions 416 stored in the storage memory 414 to implement an image preprocessing module 428 to prepare image information for additional high-level processing. An example preprocessing module 428 includes a dewarper (depending upon lens) and histogram equalization. An object detection and classification module 430 detects individual regions of interest (ROIs) within a sequence of image frames that correspond to 3D world objects within sensor unit FOV 420. An example image detection and classification module 430 performs semantic segmentation to assign a classification to each pixel within a sequence of image frames. In another example, image detection and classification module 430 uses deep learning CNN-based algorithms to perform ROI classification. In yet another example, an example classification block can use deep learning CNN-based object detection algorithms such as Single Shot Detector that can perform detection and classification at the same time.

The computing machine 412 is configured with executable instructions 416 stored in the storage memory 414 to implement a radar tracking module 432, and also, to implement a camera-detected target tracking module 434. The radar tracking module 432 tracks radar ROIs over time. An example radar tracking block 432 can track multiple moving radar ROIs. An example radar tracking module 432 creates a radar track for each detected radar, which includes: a corresponding radar ROI; a radar track identifier (radar track IDs); radar object metadata (e.g., distance, velocity, acceleration, heading); timestamp information; and radar object classification and associated confidence score. The image tracking module 434 tracks classified image ROIs corresponding to objects within the camera FOV, over time. An example image tracking module 434 tracks image ROIs that correspond to object images. An example image tracking block 434 creates a camera track for each detected object image, which includes: a corresponding image ROI; a camera track identifier (image track ID); timestamp information; and an object image classification and associated confidence score.

In an alternative example embodiment of sensor unit 402, the computing machine 412 includes a unified/multi-modal classifier (not shown) that takes the radar ROI and image ROI and performs classification based on joint set of features from both modalities. In an alternative, example embodiment of sensor unit 402, the computing machine 412 includes a mid-fusion or early-fusion module (not shown) to perform joint radar and image object detection, tracking, and classification.

Sensor Unit Object Tracks Creation

Continuing to refer to FIG. 7, the computing machine 412 is configured with executable instructions 416 stored in a storage memory 416 to implement a sensor unit track fusion module 436 to fuse radar tracks and corresponding camera tracks that track the same object within the sensor unit FOV 420. An object may be detected by one or more sensors within the sensor unit, e.g., the object may be sensed by only the radar unit 404, or by only the image unit 406, or by both the radar unit 404 and the image unit 406. An example sensor unit track fusion module 436 matches radar tracks and camera tracks that track the same object and fuses them into a single unified sensor unit track corresponding to the tracked object. The example sensor unit track fusion module 436 matches radar tracks and camera tracks based upon comparisons of information contained within the respective tracks. An example sensor unit track fusion module 436 matches radar tracks and camera tracks based upon comparisons of one or more of the tracks': radar classification and camera classifications, radar timestamp and camera timestamp information, and radar ROI and camera ROI. An example sensor unit track fusion module 436 fuses information from a matched radar track/camera track pair into a single sensor unit track that represents a single object represented by each member of the matched track/camera track pair.

Figure 9:
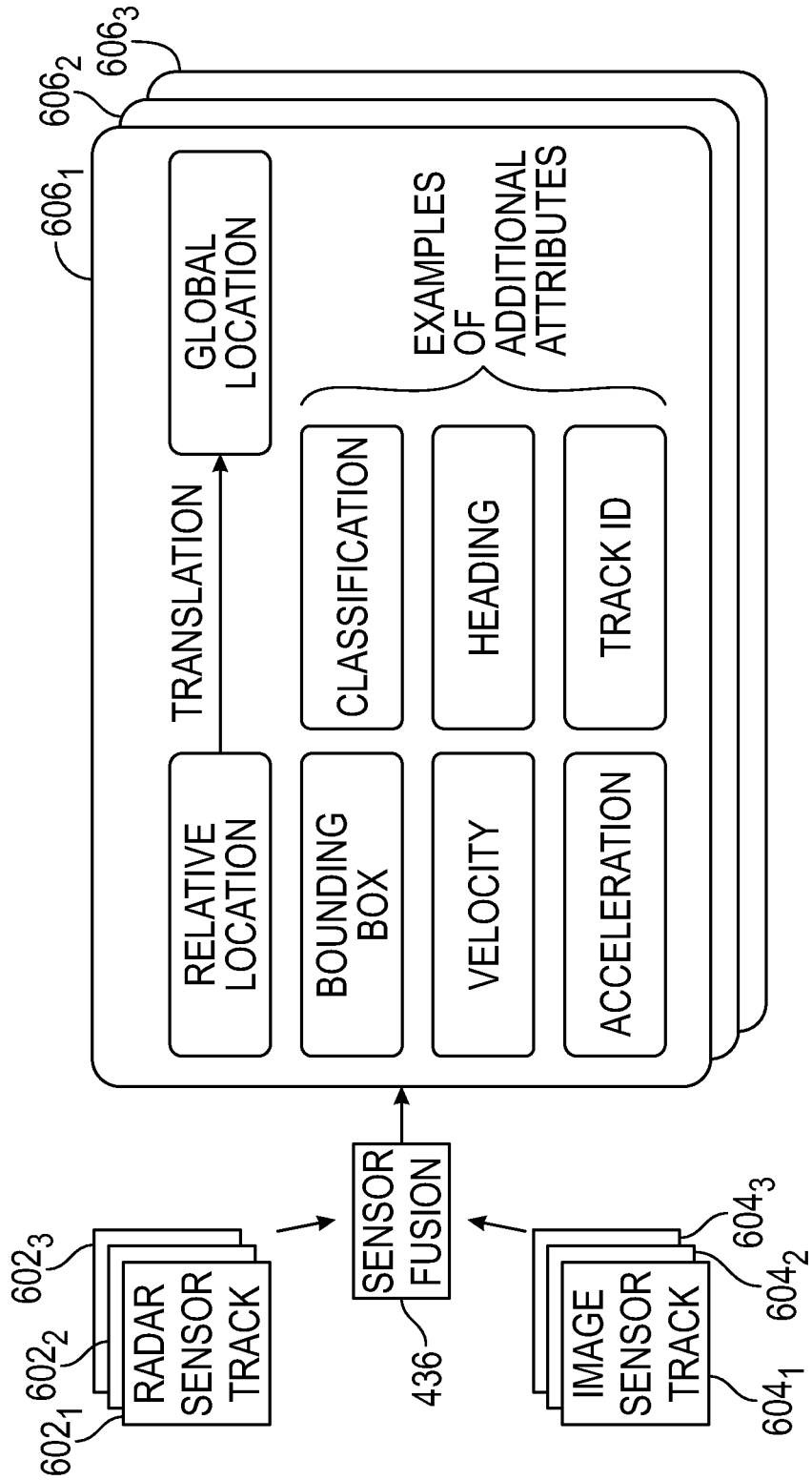
FIG. 9 is an illustrative drawing representing a sensor unit fusion module fusing multiple example radar sensor tracks and multiple example image sensor tracks to produce multiple example fused sensor unit object tracks.

FIG. 9 is an illustrative drawing representing sensor unit fusion block 436 fusing multiple example radar sensor tracks $602_1$, $602_2$, $603_3$ and multiple example image sensor tracks $604_1$, $604_2$, and $604_3$ to produce multiple example fused sensor unit object tracks $606_1$, $606_2$, and $606_3$. The sensor unit track fusion module 436 can produce a plurality of sensor unit object tracks that each corresponds to one of a plurality of detected objects. Each sensor unit track comprises a data structure stored in a storage memory that includes but is not limited to the following information about an object tacked within a sensor unit's FOV: active status, classification, motion state estimates (velocity, acceleration, heading), one or more bounding boxes on respective sensors, timestamp data point, radar and camera ROIs, active status, and track ID.

Translation of Relative Location Attributes to Universal Location Attributes

Referring once again to FIG. 7, the computing machine 412 is configured with executable instructions 416 stored in a storage memory 414 to implement a translation module 438 to translate relative object location attribute information recorded at the example sensor unit 402 to corresponding universal object location attribute information. Specifically, the translation module 438 translates relative location, relative velocity, relative acceleration, and relative heading (i.e., relative to a sensor unit coordinate system) to universal location, universal velocity, universal acceleration, and universal heading (i.e., relative to a universal reference system).

The translation module 438 uses projection to translate three-dimensional (3D) relative object attribute information to 3D universal object attribute information. As explained above, a universal location of the sensor unit is predetermined and known (e.g., (X,Y,Z) location, e.g., on the universal coordinate system 303). The relative location of a tracked object (e.g., (x,y,z) location on an individual sensor unit reference system) is known based upon measurements by the sensors at the sensor unit. The translation module 438 performs coordinate mapping from an (x,y,z) location on the individual sensor unit coordinate system to an (X,Y,Z) location in the universal coordinate system. This same mapping technique is used to map velocity, acceleration and heading from relative to the universal reference system. The translation module 438 uses the radar sensor to provide the location of an object relative to the sensor unit 402 since the radar sensor provides 3D location information, specifically, range, azimuth and potentially, elevation. A bounding box can for instance be used to crop the corresponding region as input for classification, or to identify a point or series of points that should be projected for a given object. It is contemplated that the example sensor unit 402 optionally can use sensor fusion techniques to obtain improved relative location. e.g., the sensor unit 402 can combine data from camera and radar to obtain a more accurate (x,y,z) location relative to the sensor unit.

An alternative example translation module 438 uses projection to translate two-dimensional (2D) relative object attribute information to 2D universal object attribute information.

Sensor Unit Track Fusion to Create Unified Site Track

Referring to FIG. 1, the cross-tracker 104 includes the aggregation module 120 to aggregate and preprocess time-series data streams, such as those shown in FIG. 4, for processing by the track association module 122. The cross-tracker 104 also includes the track fusion module 122 that performs the fusion operation 208 of FIG. 2, which fuses sensor unit tracks to create a unified site track, as those shown in FIG. 4.

Figure 10:
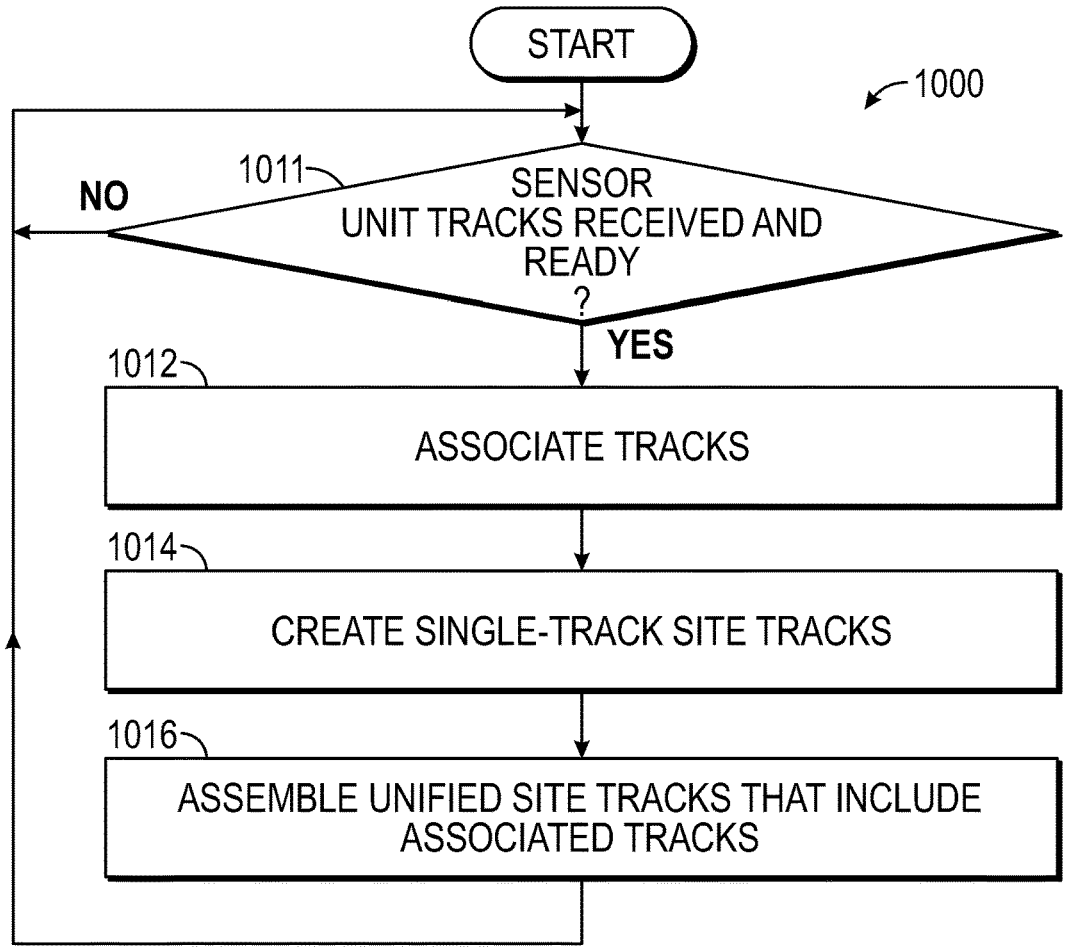
FIG. 10 is an illustrative flow diagram representing a fusion method to fuse sensor unit object tracks to create a unified site track.

FIG. 10 is an illustrative flow diagram representing a method 1100 to fuse sensor unit object tracks to create a unified site track. The method 1100 provides additional details of operation 208 of FIG. 2, in accordance with some embodiments. Operation 1011 determines whether tracks have been received and aggregated and are ready for fusion processing. Sensor unit tracks ready for processing include sensor unit tracks that have not yet been subject to fusion processing and sensor unit tracks that already have. Operation 1012 uses a cost function to associate sensor unit tracks from different sensor units to each other and/or to the site tracks. More particularly, operation 1012 identifies similarities and correlations between corresponding attributes of pairs of sensor unit tracks and/or a sensor unit track to a site track, and identifies similarities between corresponding attributes of pairs of tracks. In one embodiment, operation 1012 identifies the correlations by computing the likelihoods for association using an objective cost function and determines whether the identified correlations satisfy a threshold for associating one or more pairs of sensor unit tracks with one another and/or for associating one or more pairs consisting of a single-track site track with a sensor unit track. In one embodiment, the threshold may indicate a minimum percentage of correlation, a confidence interval for the correlation or another metric that facilitates the fusion module 122 ensuring an association is valid. Operation 1014 converts each sensor unit track that does not meet the threshold to a new single-track site track. Creating a single-track site track based upon a sensor unit track includes creating a site track identifier for the newly created single-track site track. Operation 1014 adds each newly created single-track site track to the aggregated tracks indicated as ready at operation 1011 for consideration in a subsequent iteration of the method 1100. Operation 1016 builds up or updates a unified site track for each single or pair of sensor unit tracks that have been associated with it. In one embodiment, operation 1016 applies a Kalman filter to an associated pair of sensor unit tracks that meet the threshold to assemble a corresponding unified site track corresponding to the associated sensor unit tracks. Similarly, operation 1016 applies the Kalman filter to a single associated sensor unit track that meets the threshold to produce and/or build up a corresponding unified site track corresponding to the associated single-track site track. It will be appreciated that assembling a unified site track can include using more than one associated sensor unit tracks or a single associated sensor unit track that meets the threshold, to create a corresponding new site track or to update an existing site track. In one embodiment, operation 1016 accesses object attribute information from multiple sensor unit tracks to identify associated tracks to be included in a site track. Control then flows back to operation 1011 and the process recurses. Over time, operation 1016 builds up a unified site track corresponding to an object, creating a framework for a map of site locations traversed by the object at a physical site. Each sensor unit track includes incremental unified position attribute information and other incremental object attribute information for the object at a different moment in time. Collectively, the sensor unit tracks fused within a unified site track provide a unified view of the object's motion at the site. It also will be appreciated that multiple unified site tracks may be built up over time, each corresponding to a different object tracked at the site. It is appreciated by those ordinarily skilled in the art that a Kalman filter is used to explore correlative characteristics of each track along a temporal axis. It is assumed that a tracked object moves smoothly over a period of time.

It will be appreciated that fusion process 1100 depends upon both correlations between location-based attributes and non-location attributes. Referring to FIG. 3 for example, in regions where the first and second paths 314, 822 are spaced far apart, such as the ninth FOV $310_9$, location-based attributes can be most useful in distinguishing between sensor unit tracks that relate to different objects. However, the first and second object paths 314 and 822 intersect twice. A first intersection occurs in the overlapping regions of the seventh and eighth FOVs $310_7$, $310_8$, and a second intersection occurs in the non-overlapping region of the seventh FOV $310_7$. Considering the first intersection, both the seventh and the eighth sensor units $102_7$, $102_8$ produce a sensor unit track for the first object $O_A$ and a sensor unit track for the second object $O_B$. For example, the seventh sensor unit $102_7$ produces sensor unit track $TO_{A/7}$ and sensor unit track $TO_{B/7}$ corresponding to the first and second objects, respectively, described above with reference to FIG. 4. Similarly, the eighth sensor unit $102_8$ produces sensor unit track $TO_{A/8}$ and sensor unit track $TO_{B/8}$ corresponding to the first and second objects, respectively, described above with reference to FIG. 4. The fusion process 1100 should fuse $TO_{A/7}$ with $TO_{A/8}$ and should fuse $TO_{B/7}$ with $TO_{B/8}$. To reach that result, however, the fusion process 1100 probably will rely more heavily upon non-location-based attributes such as classification to determine which sensor unit tracks to fuse.

Example Scenario

Referring to FIG. 3, assume for example that the first and second buildings 304, 306 are part of a large warehouse. The warehouse site, which includes a predetermined geographic region outside buildings that extends some predetermined distances from the outside perimeters of the buildings. The warehouse site, which encompasses the predetermined geographic region, is completely covered by FOVs of sensor units $102_1$-$102_{14}$. Different classes of objects including but not limited to trucks, pedestrians, sedans, and wildlife move around the site at any hour of the day. Assume that the first object $O_A$ is a truck making a delivery to the warehouse site. Assume that the driver of the truck, the first object $O_A$, drives along a side of the first building 304. Each of the seventh, eighth, and ninth sensor units $102_7$, $102_8$, $102_9$, detects the position of the truck relative to the sensor unit and other attributes of the truck such as its heading, velocity, and object classification. The sensor units stream the attribute information to the cross-unit tacker 104. The sensor system 102, at either the individual sensor units $102_7$, $102_8$, $102_9$ or at the cross-unit tacker 104 determines world geolocation of the truck at the (lat/lon/height) based upon the known locations of the sensor units $102_7$, $102_8$, $102_9$. The cross-unit tracker 104 performs track association across the different data streams it receives from sensor units based at least in part upon the world geolocation coordinates. The combination of detections and tracking attributes obtained using the sensor units are connected in one or more memory devices to form a single track. As the data is streamed in, the detection and tracking results generated separately by the different sensor units are continuously fed into the cross-unit tracker 104. In the end instead of a multitude of disconnected paths created using the different sensor units, a single unified track is obtained, which shows the entire trajectory of the truck's movement throughout the site.

This continuous track containing object attributes allows for various analytics. For example, a user can log into a web app and view a map of the site (or aerial imagery). As a user pans around the site map they can see the tracks of where the truck traveled. A user designates a timeline and hits play to see where the truck moved during a time interval. While the truck is moving about the site, an icon can be displayed on a live map to indicate the truck's current location. Icons can be displayed to illustrate the classifications of tracked objects (vehicle/pedestrian/etc.). A heatmap of an aerial view (or map view) of the site can be displayed showing the most traveled areas of the site. Activity displays can be filtered based upon object classification (truck/pedestrian/sedan/etc.), date/time/time of day, zones, and patterns of movement. Additional object attributes may be visualized on the map as well. For example, color can be used to indicate velocity and a triangle/arrow may be used to indicate heading.

Visualization Subsystem

Figure 11:
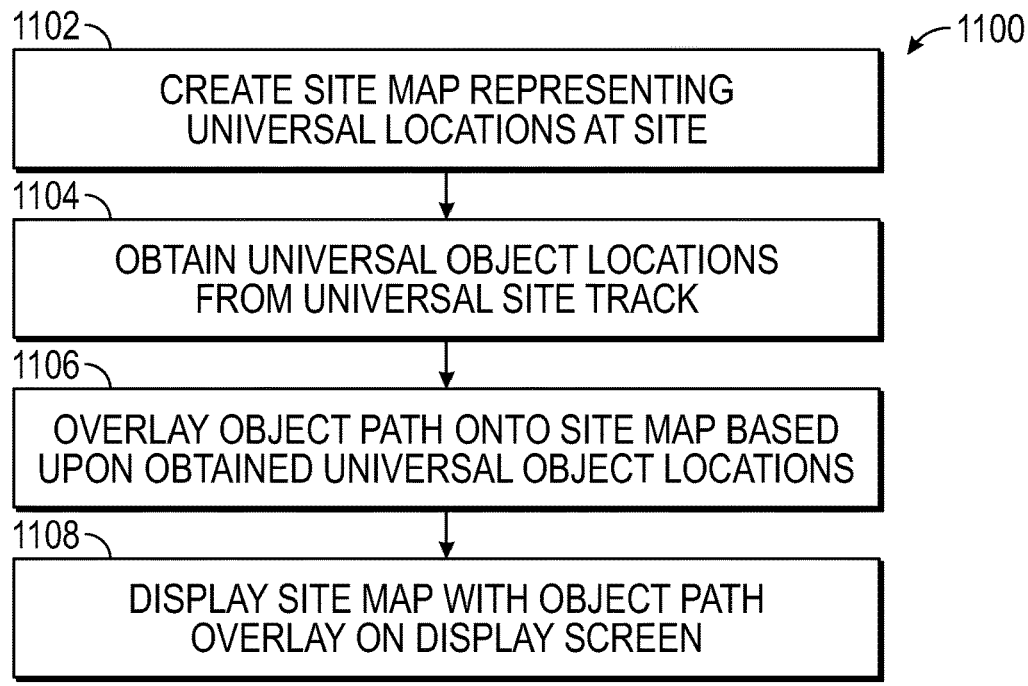
FIG. 11 is an illustrative flow diagram representing an example process to produce a unified view including a site path and an object path.

Referring to FIG. 1, the visualization subsystem 110 includes a computing machine configured with executable instructions stored in storage memory to provide a real-time visualization of activity at a site. Activity can include physical presence or motion of entities (e.g., persons/vehicles) on a site. An example visualization subsystem 110 is configured to display on the electronic display screen 305 of FIG. 3, a bird's eye view (BEV) map of a site, with one or more overlaid tracked object locations at the site. A sequence of object locations comprises an object path at the site. FIG. 11 is an illustrative flow diagram representing a process performed using the visualization system 110. Operation 1102 creates a site map to cause an electronic display screen 305 of FIG. 3 to display a visual image of a site. The site map provides visual context for display of a visual image of an object's location at a physical site at different instances in time. An example site map can include one or more real images of a physical site, such as a bird's eye view (e.g., a satellite view) or a 2D or 3D map representation of the physical site. Operation 1104 obtains universal object location information from a unified site track in memory such as the first unified site track 452 of FIG. 5 or the second unified site track 454 of FIG. 6. Operation 1106 determines an overlay of one or more tracked object locations onto the site map based upon the obtained universal object locations. The individual sensor unit tracks that are fused to create a unified site track contain universal object location information, which is mapped to locations on the site map. Thus, the translation of relative object locations to universal object locations permits use of the unified site tracks, which contain the translated universal object location information, to track an object across FOVs of non-collocated sensor units. Operation 1108 causes the computing machine of the visualization subsystem 110 to display on the screen display 305 the site map with and to display the determined object path overlaid onto the site map. The visualization can include augmentations such as color coding to indicate velocity or arrows/triangles to indicate direction. A visual enhancement such as a heat map can be used to indicate regions of a site that objects most frequently traverse, for example.

Alarm Monitoring Subsystem

The alarm monitoring subsystem 112 includes a computing machine configured with executable instructions saved in temporary buffer memory (not shown) for real-time processing during time-series data streaming, or long-term memory, to trigger an alarm in response to an alarm event detected based upon unified site track e.g., 452, 454 stored in the storage memory 1112. Alarm event rules specify events that trigger an alarm. Site object data structures are assembled in real-time in response to the time-series data streams. The attributes included within the site object track data structures are monitored and observed to identify alarm events. For example, a velocity attribute in a site object track data structure indicating that a vehicle is exceeding a speed limit could be designated as an alarm event. For example, a geographic area of a site could be designated as restricted access, and a geolocation attribute in a site object track data structure indicating that an entity has entered the restricted area could be designated as an alarm event.

Database Storage Subsystem

The database/storage subsystem 114 includes a computing machine configured with executable instructions saved in storage memory to a query database. Site object track data structures are stored in a query data base so that they can be searched based upon types of attributes contained within the site object track data structures. A database query can be launched in the database that specifies an attribute and a parameter for the attribute, and in response, the database returns all site object track data structures that comply with the query. For example, the query might specify a timestamp attribute and a particular date and time frame. In response, the database returns indicia, e.g., identifying information, for all site object track data structures that satisfy the query. A user then can select one or more of the returned site object track data structures for display on a computer display as an overlay to a bird's eye view (BEV) map of a site, such as the site 302 of FIG. 3.

Computing Machine

Figure 12:
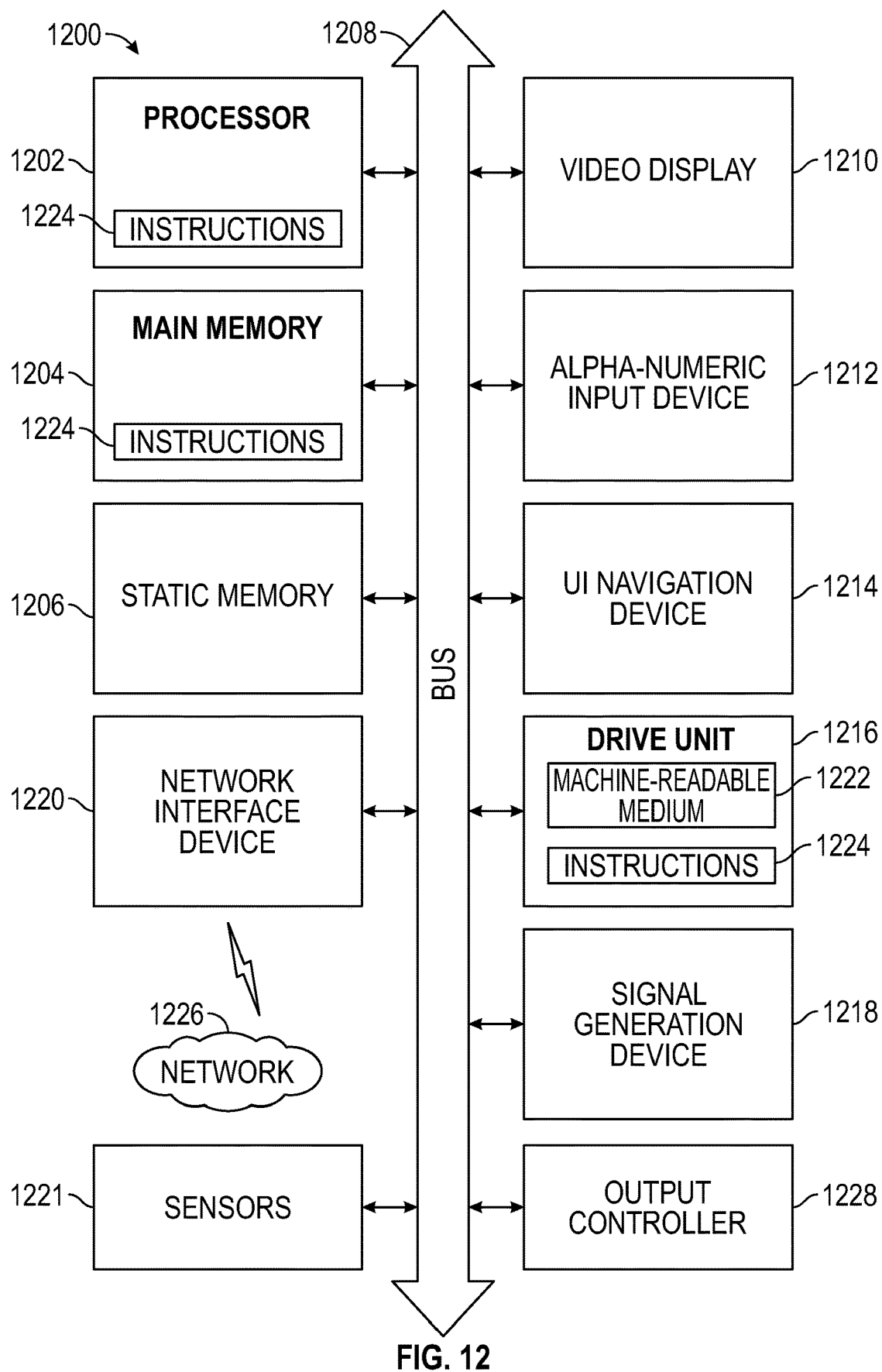
FIG. 12 is an illustrative block diagram of an example computing machine in accordance with some embodiments.

FIG. 12 is an illustrative block diagram of an example computing machine 1200 in accordance with some embodiments. In some embodiments, the computing machine 1200 may store the components shown in the circuit block diagram of FIG. 12. For example, circuitry that resides in the processor 1202 and may be referred to as "processing circuitry." Processing circuitry may include processing hardware, for example, one or more central processing units (CPUs), one or more graphics processing units (GPUs), and the like. In alternative embodiments, the computing machine 1200 may operate as a standalone device or may be connected (e.g., networked) to other computers. In a networked deployment, the computing machine 1200 may operate in the capacity of a server, a client, or both in server-client network environments. In an example, the computing machine 1200 may act as a peer machine in peer-to-peer (P2P) (or other distributed) network environment. In this document, the phrases P2P, device-to-device (D2D) and sidelink may be used interchangeably. The computing machine 1200 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. The sensor units $102_1$-$102_n$ and the cross-unit tracker 104 of FIG. 1 and the sensor unit 402 of FIG. 7 are implemented using one or more computing machines and storage devices that store instructions that when executed, using the computing machines, cause the computing machines to perform the above-described processes of the sensor units $102_1$-$102_n$ and 402 and the cross-unit tracker 104.

Examples, as described herein, may include, or may operate on, logic or a number of components, modules, or mechanisms. Modules and components are tangible entities (e.g., hardware) capable of performing specified operations and may be configured or arranged in a certain manner. A module can include a computing machine 2220 or portions thereof. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processing circuitry configured using software, the general-purpose hardware processing circuitry may be configured through executing instructions stored in a memory device as respective different modules at different times. Software may accordingly configure hardware processing circuitry, for example, to constitute a particular module at one instance of time and to constitute a different module at a different instance of time.

The computing machine 1200 may include hardware processing circuitry 1202 (e.g., a central processing unit (CPU), a GPU, a hardware processor core, or any combination thereof), a main memory 1204 and a static memory 1206, some or all of which may communicate with each other via an interlink (e.g., bus) 1208. Although not shown, the main memory 1204 may contain any or all of removable storage and non-removable storage, volatile memory, or non-volatile memory. The computing machine 1200 may further include a video display unit 1210 (or other display unit), an alphanumeric input device 1222 (e.g., a keyboard), and a user interface (UI) navigation device 1214 (e.g., a mouse). In an example, the display unit 1210, input device 1222 and UI navigation device 1214 may be a touch screen display. The computing machine 1200 may additionally include a storage device (e.g., drive unit) 1216, a signal generation device 1218 (e.g., a speaker), a network interface device 1220, and one or more sensors 2221, such as a global positioning system (GPS) sensor, compass, accelerometer, or other sensor. The computing machine 1200 may include an output controller 12288, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 1216 (e.g., a storage device) may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the computing machine 1200. In an example, one or any combination of the hardware processor 1202, the main memory 1204, the static memory 1206, or the storage device 1216 may constitute machine readable media.

While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the computing machine 1200 and that cause the computing machine 1200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1220 may include one or more physical jacks (e.g., Ethernet, coaxial, or phone jacks) or one or more antennas to connect to the communications network 1226.

Machine Learning

Figure 13:
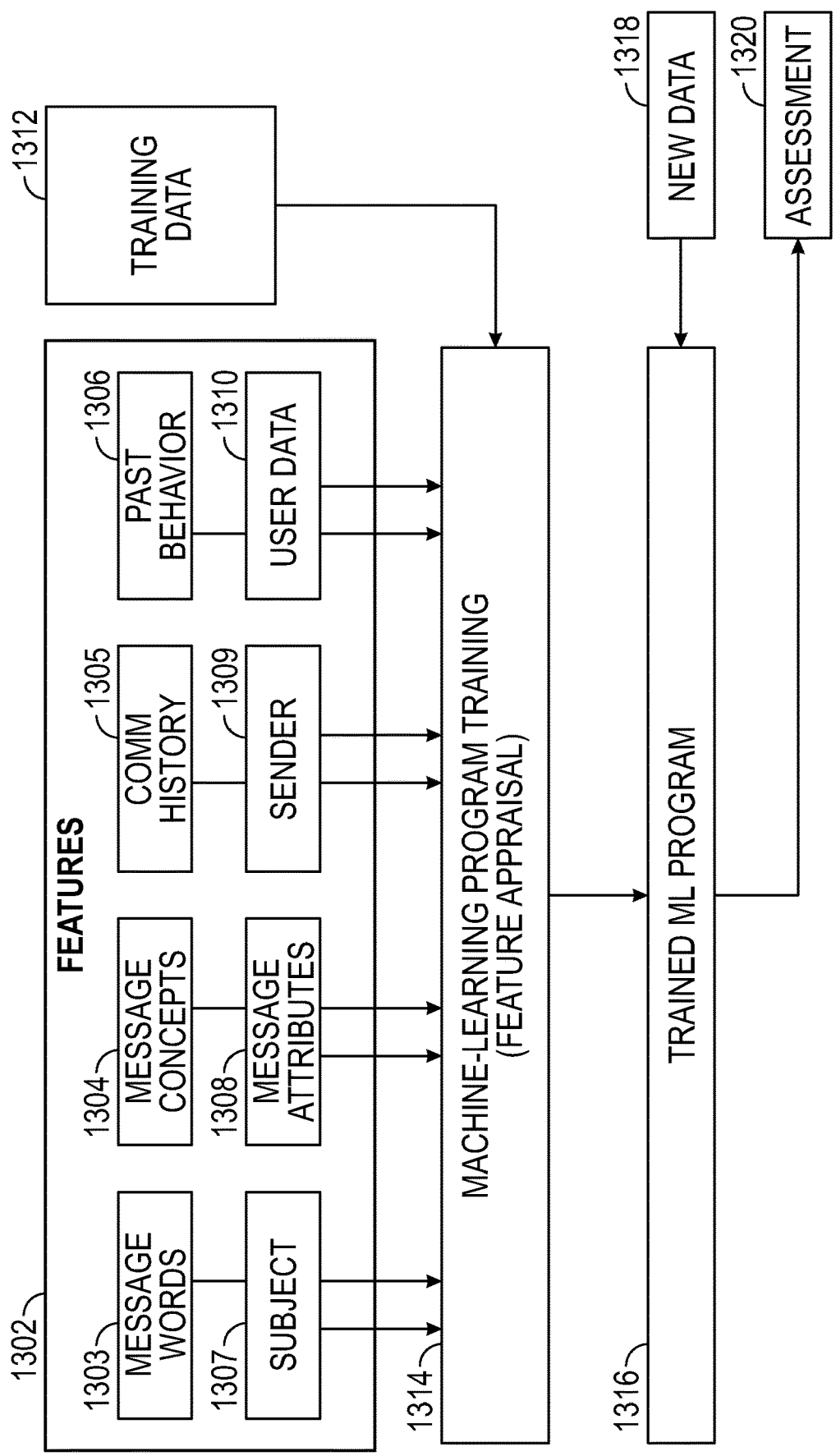
FIG. 13 illustrates the training and use of a machine-learning program, according to some example embodiments.

FIGS. 13-16 are illustrative drawings describing machine learning techniques and systems that can be used to train modules 426 and 430, for example, in accordance with some embodiments. One or more computing machines can be specially configured with instructions stored in a memory device, which when executed by the computing machines, cause the computing machines to perform the methods of FIGS. 13-16. FIG. 13 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 1318 in order to make data-driven predictions or decisions expressed as outputs or assessments 1320. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 1818 to find correlations among identified features 1302 that affect the outcome.

The machine-learning algorithms utilize features 1302 for analyzing the data to generate assessments 1320. A feature 1302 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 1302 may be of different types and may include one or more of words of the message 2303, message concepts 1304, communication history 2305, past user behavior 1306, subject of the message 2307, other message attributes 1308, sender 2309, and user data 2380.

The machine-learning algorithms utilize the training data 2323 to find correlations among the identified features 1302 that affect the outcome or assessment 1320. In some example embodiments, the training data 1312 includes labeled data, which is known data for one or more identified features 1302 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 1312 and the identified features 1302, the machine-learning tool is trained at operation 1314. The machine-learning tool appraises the value of the features 1302 as they correlate to the training data 1312. The result of the training is the trained machine-learning program 1316.

When the machine-learning program 1316 is used to perform an assessment, new data 2323 is provided as an input to the trained machine-learning program 1316, and the machine-learning program 1316 generates the assessment 1320 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised, indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model, satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

Figure 14:
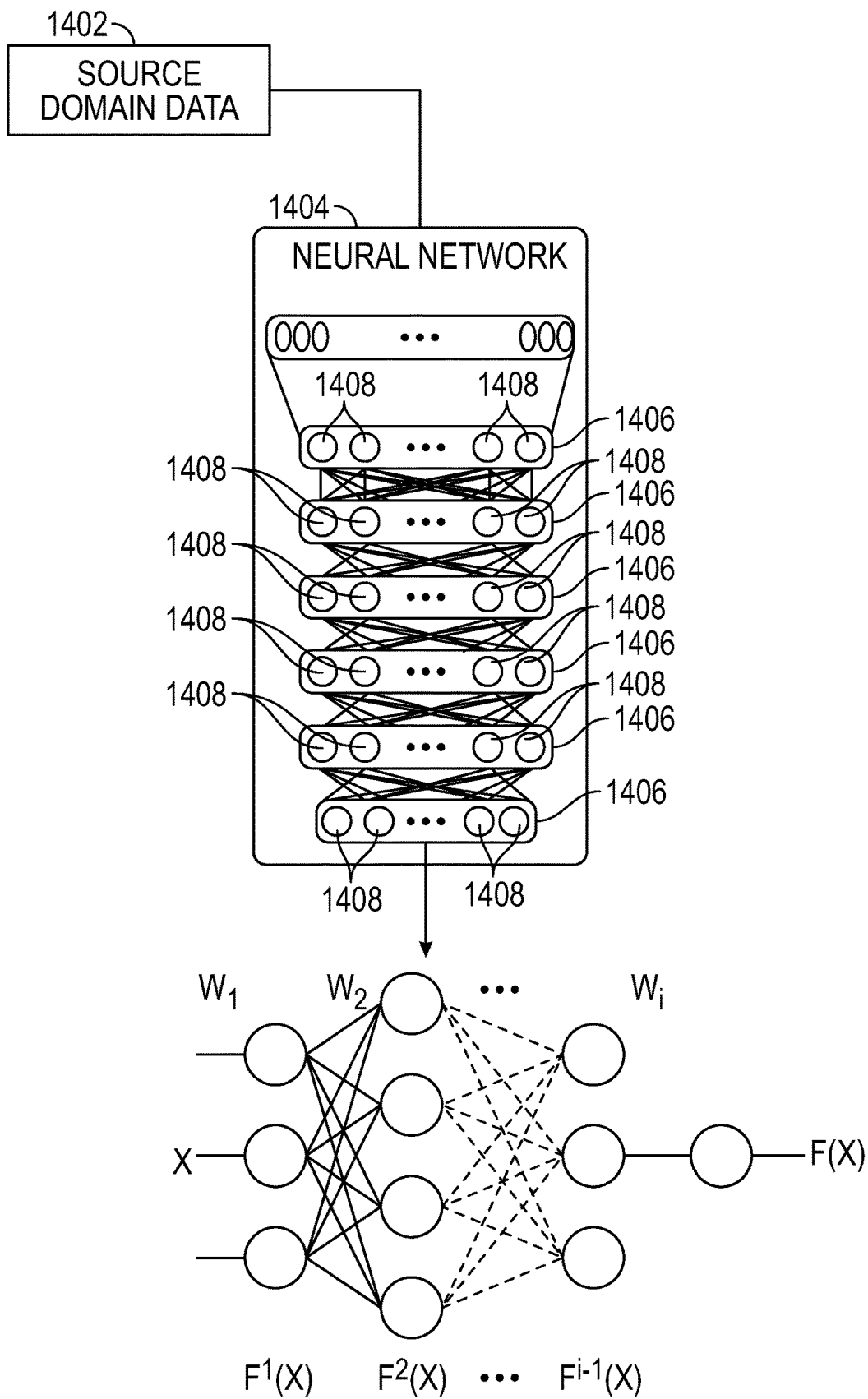
FIG. 14 illustrates an example neural network, in accordance with some embodiments.

FIG. 14 illustrates an example neural network 1404, in accordance with some embodiments. As shown, the neural network 1404 receives, as input, source domain data 1402. The input is passed through a plurality of layers 1406 to arrive at an output. Each layer 1406 includes multiple neurons 2408. The neurons 2408 receive input from neurons of a previous layer 1406 and apply weights to the values received from those neurons 2408 in order to generate a neuron output. The neuron outputs from the final layer 1406 are combined to generate the output of the neural network 1404.

As illustrated at the bottom of FIG. 14, the input is a vector x. The input is passed through multiple layers 1406, where weights $W_1, W_2, \ldots, W_i$ are applied to the input to each layer to arrive at $f^1(x), f^2(x), \ldots, f^{i-1}(x)$, until finally the output f(x) is computed.

In some example embodiments, the neural network 1404 (e.g., deep learning, deep convolutional, or recurrent neural network) comprises a series of neurons 2408, such as Long Short Term Memory (LSTM) nodes, arranged into a network. A neuron 2408 is an architectural element used in data processing and artificial intelligence, particularly machine learning, which includes memory that may determine when to "remember" and when to "forget" values held in that memory based on the weights of inputs provided to the given neuron 2408. Each of the neurons 2408 used herein is configured to accept a predefined number of inputs from other neurons 2408 in the neural network 1404 to provide relational and sub-relational outputs for the content of the frames being analyzed. Individual neurons 2408 may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of ordinary skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 15:
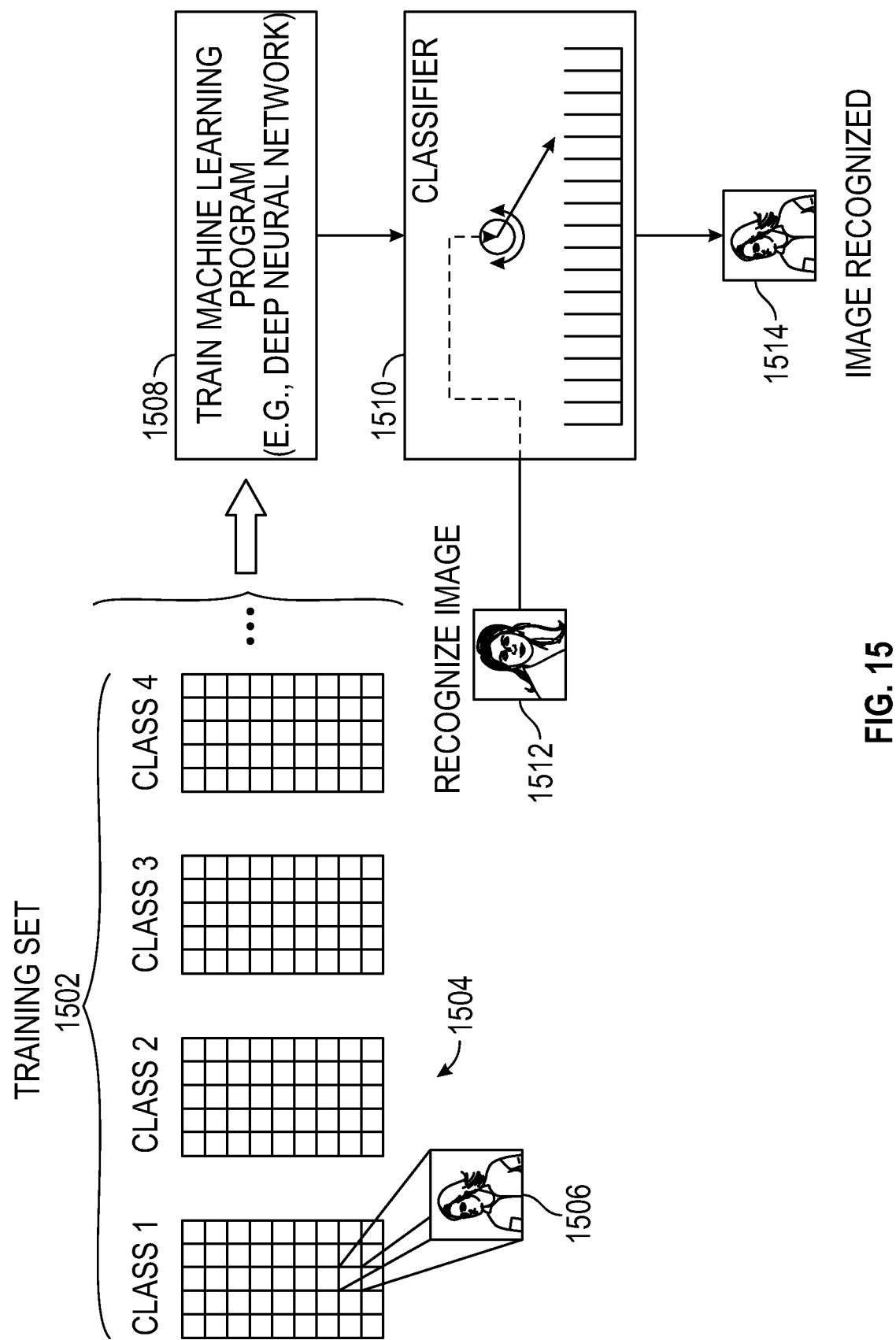
FIG. 15 illustrates the training of an image recognition machine learning program, in accordance with some embodiments.

FIG. 15 illustrates the training of an image recognition machine learning program, in accordance with some embodiments. The machine learning program may be implemented at one or more computing machines. As shown, training set 1502 includes multiple classes 1504. Each class 1504 includes multiple images 1506 associated with the class. Each class 1504 may correspond to a type of object in the image 1506 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At module 1508 the machine learning program is trained, for example, using a deep neural network. The trained classifier 1510, generated by the training of module 1508, recognizes an image 1512, and at module 1514 the image is recognized. For example, if the image 312 is a photograph of Bill Clinton, the classifier recognizes the image as corresponding to Bill Clinton at module 314.

A machine learning algorithm is designed for recognizing faces, and a training set 1502 includes data that maps a sample to a class 1504 (e.g., a class includes all the images of purses). The classes may also be referred to as labels or annotations. Although embodiments presented herein are presented with reference to object recognition, the same principles may be applied to train machine-learning programs used for recognizing any type of items.

The training set 1502 includes a plurality of images 1506 for each class 1504 (e.g., image 1506), and each image is associated with one of the categories to be recognized (e.g., a class). The machine learning program is trained at module 1508 with the training data to generate a classifier at module 1510 operable to recognize images. In some example embodiments, the machine learning program is a DNN.

When an input image 1512 is to be recognized, the classifier 1510 analyzes the input image 1512 to identify the class corresponding to the input image 1512. This class is labeled in the recognized image at module 1514.

Figure 16:
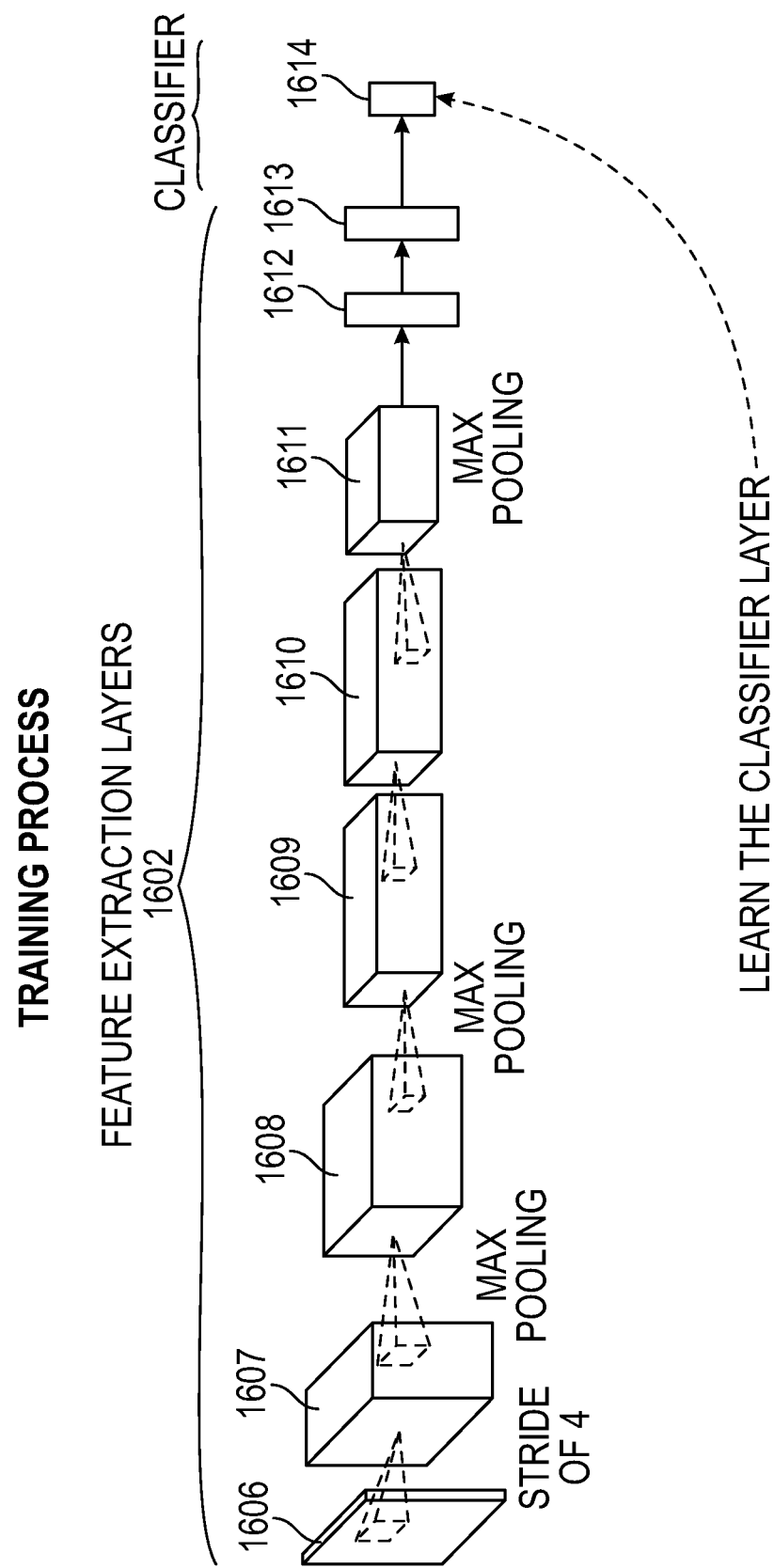
FIG. 16 illustrates the feature-extraction process and classifier training, according to some example embodiments.

FIG. 16 illustrates the feature-extraction process and classifier training, according to some example embodiments. Training the classifier may be divided into feature extraction layers 1602 and classifier layer 1614. Each image is analyzed in sequence by a plurality of layers 1606-1613 in the feature-extraction layers 1602.

With the development of deep convolutional neural networks, the focus in face recognition has been to learn a good face feature space, in which faces of the same person are close to each other and faces of different persons are far away from each other. For example, the verification task with the LFW (Labeled Faces in the Wild) dataset has often been used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as by reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 1614. In FIG. 16, the data travels from left to right as the features are extracted. The goal of training the neural network is to find the parameters of all the layers that make them adequate for the desired task.

The invention claimed is:

1. A system comprising:
multiple respective multi-sensor units that are non-collocated at a site that is associated with a universal coordinate system, each respective multi-sensor unit including,
a respective radar sensor; and
a respective image sensor;
wherein the respective radar sensor and the respective image sensor share a respective field of view (FOV) of the respective multi-sensor unit;
wherein the respective radar sensor is associated with a respective local sensor coordinate system;
further including:
processing circuitry; and
at least one non-transitory machine-readable memory medium storing instructions which, when executed by the processing circuitry, cause the processing circuitry to perform operations comprising:
for each respective multi-sensor unit, producing multiple respective radar sensor tracks, that each corresponds to a different object detected within a respective FOV of the respective multi-sensor unit using a respective radar sensor of the respective multi-sensor unit, and that each includes respective radar-based relative object attribute information determined relative to a respective local sensor coordinate system associated with the respective radar sensor unit of the respective multi-sensor unit;
for each respective multi-sensor unit, producing multiple respective image sensor tracks, that each corresponds to a different object detected within a respective FOV of the respective multi-sensor unit using a respective image sensor of the respective multi-sensor unit, and that each includes respective image-based object attribute information;
for each respective multi-sensor unit, fusing respective radar sensor tracks produced using a respective radar sensor of the respective multi-sensor unit with respective image sensor tracks produced using a respective image sensor of the respective multi-sensor unit, based at least in part upon respective radar-based relative object attribute information determined relative to a respective local sensor coordinate system and respective image-based object attribute information, to produce multiple respective multi-sensor unit tracks, each respective multi-sensor unit track corresponding to a different one of the respective objects detected using the respective radar sensor of the respective multi-sensor unit and detected using the respective image sensor of the respective multi-sensor unit;
for each respective multi-sensor unit track, translating respective radar-based relative object attribute information included within the respective multi-sensor unit track, determined relative to a respective local coordinate system, to respective radar-based universal object attribute information, determined relative to the universal coordinate system;

fusing one or more sets of the multi-sensor unit tracks, based at least in part upon radar-based universal object attribute information and respective image-based object attribute information included within attributes of the sets of the multi-sensor unit tracks, to produce one or more unified site tracks; and saving the one or more unified site tracks in a non-transitory machine-readable medium.

2. The system of claim 1,
wherein each sensor unit is associated with a different local sensor unit coordinate system;
wherein the site is associated with the universal coordinate system; and
wherein the universal coordinate system is a global coordinate system.

3. The system of claim 1,
wherein each multi-sensor unit is associated with a different local sensor unit coordinate system;
wherein the site is associated with the universal coordinate system; and
wherein the universal coordinate system is a site-specific coordinate system.

4. The system of claim 1,
wherein two or more multi-sensor units have overlapping sensor FOVs.

5. The system of claim 1,
Wherein each multi-sensor unit having a fixed location at the site and a fixed FOV of a portion of the site.

6. The system of claim 1, the operations further including:
displaying on an electronic display screen a visual site map indicating one or more object paths at the site, based at least in part upon corresponding universal object attribute information included in the one or more unified site tracks.

7. The system of claim 6,
wherein the site and the visual site map each is associated with the universal coordinate system;
the operations further including:
accessing universal object locations included in the one or more unified site tracks; and
electronically overlaying one or more object locations onto the site map displayed on the electronic display screen based upon the accessed universal object locations and the universal coordinate system.

8. The system of claim 1, the operations further including:
monitoring attributes in the one or more unified site tracks to identify an alarm event; and
triggering an alarm in response to detecting an occurrence of an alarm event.

9. The system of claim 8,
wherein producing the respective multi-sensor unit tracks corresponding to respective multi-sensor units includes producing respective time-series data streams of multi-sensor unit tracks corresponding to the sensor units; and
wherein fusing one or more respective sets of the multi-sensor unit tracks includes fusing the one or more time-series data streams of sensor unit tracks, based at least in part upon corresponding universal object attribute information and respective image-based classification of the one or more time-series data streams of multi-sensor unit tracks, to produce one or more unified site tracks that include one or more of the corresponding universal object attribute information and respective image-based classification.

10. The system of claim 1, the operations further including:
receiving a request to display one or more object locations based at least in part upon at least one of radar-based object attribute information or image-based object attribute information;
identifying one or more unified site tracks saved in the non-transitory machine-readable medium that include the at least one of radar-based object attribute information or image-based object attribute information; and
displaying on an electronic display screen a visual site map indicating one or more object paths at the site.

11. The system of claim 10,
wherein the multi-sensor unit tracks corresponding to multi-sensor units include time-series data streams corresponding to the multi-sensor units; and
wherein fusing one or more respective sets of the multi-sensor unit tracks includes fusing one or more time-series data streams of multi-sensor unit tracks, based at least in part upon corresponding universal object attribute information and respective image-based classification of the one or more time-series data streams of multi-sensor unit tracks, to produce one or more unified site tracks that include one or more of the corresponding universal object attribute information and respective image-based classification.

12. The system of claim 1 further including:
wherein the processing circuit includes first processing circuitry and second processing circuitry; and
wherein the at least one non-transitory machine-readable memory medium includes first memory circuitry and second memory circuitry;
wherein the first memory circuitry storing instructions which, when executed by the first processing circuitry, cause the first processing circuitry to perform operations comprising:
for each respective multi-sensor unit, fusing respective radar sensor tracks produced using a respective radar sensor of the respective multi-sensor unit with respective image sensor tracks produced using a respective image sensor of the respective multi-sensor unit, based at least in part upon respective radar-based relative object attribute information determined relative to a respective local sensor coordinate system and respective image-based object attribute information, to produce multiple respective multi-sensor unit tracks, each respective multi-sensor unit track corresponding to a different one of the respective objects detected using the respective radar sensor of the respective multi-sensor unit and detected using the respective image sensor of the respective multi-sensor unit;
for each respective multi-sensor unit track, translating respective radar-based relative object attribute information included within the respective multi-sensor unit track, determined relative to a respective local coordinate system, to respective radar-based universal object attribute information, determined relative to the universal coordinate system;
wherein the second memory circuitry storing instructions which, when executed by the second processing circuitry, cause the second processing circuitry to perform operations comprising:
fusing one or more sets of the multi-sensor unit tracks, based at least in part upon radar-based universal object attribute information and respective image-based object attribute information included within attributes of the sets of the multi-sensor unit tracks, to produce the one or more unified site tracks.

13. The system of claim 1 further including:
wherein the processing circuit includes first processing circuitry and second processing circuitry; and
wherein the at least one non-transitory machine-readable medium includes first memory circuitry and second memory circuitry;
wherein the first memory circuitry storing instructions which, when executed by the first processing circuitry, cause a corresponding the first processing circuitry to perform operations comprising:
for each respective multi-sensor unit, fusing respective radar sensor tracks produced using a respective radar sensor of the respective multi-sensor unit with respective image sensor tracks produced using a respective image sensor of the respective multi-sensor unit, based at least in part upon respective radar-based relative object attribute information determined relative to a respective local sensor coordinate system and respective image-based object attribute information, to produce multiple respective multi-sensor unit tracks, each respective multi-sensor unit track corresponding to a different one of the respective objects detected using the respective radar sensor of the respective multi-sensor unit and detected using the respective image sensor of the respective multi-sensor unit;
wherein the second memory circuitry storing instructions which, when executed by the second processing circuitry, cause the second processing circuitry to perform operations comprising:
for each respective multi-sensor unit track, translating respective radar-based relative object attribute information included within the respective multi-sensor unit track, determined relative to a respective local coordinate system, to respective radar-based universal object attribute information, determined relative to the universal coordinate system;
fusing one or more sets of the multi-sensor unit tracks, based at least in part upon radar-based universal object attribute information and respective image-based object attribute information included within attributes of the sets of the multi-sensor unit tracks, to produce the one or more unified site tracks.

14. The system of claim 1,
wherein respective radar-based relative object attribute information indicates one or more of location, velocity, acceleration, or heading corresponding to respective object, relative to a respective local sensor coordinate system associated with a respective multi-sensor unit used to sense the respective object; and
wherein for each multi-sensor unit track, translating respective relative radar-based relative object location attribute information to respective universal object attribute information relative to a universal sensor coordinate system includes, translating respective radar-based local object attribute information that indicates one or more of location, velocity, acceleration, or heading of the respective object, relative to a respective local sensor coordinate system to respective universal object attribute information that indicates one or more of location, velocity, acceleration, or heading of the respective object, relative to the universal sensor coordinate system.

15. The system of claim 1,
wherein the respective radar sensor tracks include radar timestamp information;
wherein the respective image sensor tracks include image timestamp information; and
wherein, for one or more respective multi-sensor units, fusing a respective radar sensor track that corresponds to a respective object and a respective image sensor track that corresponds to the respective object includes matching respective radar timestamp information for the respective object with respective image timestamp information for the respective object.

16. The system of claim 1,
wherein the respective radar sensor tracks include radar region of interest (ROI) information;
wherein the respective image sensor tracks includes image ROI information; and
wherein, for one or more respective multi-sensor units, fusing a respective radar sensor track that corresponds to a respective object and a respective image sensor track that corresponds to the respective object includes matching respective radar ROI information for the respective object with respective image ROI information for the respective object.

17. The system of claim 1,
wherein the respective radar sensor tracks include radar-based classifications; and
wherein, for one or more respective multi-sensor units, fusing a respective radar sensor track that corresponds to a respective object and a respective image sensor track that corresponds to the respective object includes matching a respective radar-based classification for the respective object with a respective image-based classification for the respective object.

18. The system of claim 1,
wherein for two or more of the respective multi-sensor units, respective image-based object attribute information includes respective image-based classifications; and
wherein fusing the one or more sets of the multi-sensor unit tracks includes fusing at least one pair of multi-sensor unit tracks based at least in part upon matching respective image-based classifications included within the pair of multi-sensor tracks.

19. The system of claim 12,
wherein the first processing circuitry includes respective separate processing circuitry at each respective multi-sensor unit.

20. The system of claim 13,
wherein the first processing circuitry includes respective separate processing circuitry at each respective multi-sensor unit.

* * * * *